United States Patent
Okada et al.

(10) Patent No.: US 10,875,447 B2
(45) Date of Patent: Dec. 29, 2020

(54) OPTICAL AXIS CONTROL APPARATUS

(71) Applicant: MITSUBISHI ELECTRIC CORPORATION, Tokyo (JP)

(72) Inventors: Mitsuaki Okada, Tokyo (JP); Takashi Osawa, Tokyo (JP); Wataru Tsujita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/074,606

(22) PCT Filed: Mar. 30, 2016

(86) PCT No.: PCT/JP2016/060412
§ 371 (c)(1),
(2) Date: Aug. 1, 2018

(87) PCT Pub. No.: WO2017/168636
PCT Pub. Date: Oct. 5, 2017

(65) Prior Publication Data
US 2019/0016248 A1 Jan. 17, 2019

(51) Int. Cl.
*B60Q 1/115* (2006.01)
*B60Q 1/08* (2006.01)
(Continued)

(52) U.S. Cl.
CPC ............ *B60Q 1/115* (2013.01); *B60Q 1/0023* (2013.01); *B60Q 1/085* (2013.01); *G01P 15/165* (2013.01);
(Continued)

(58) Field of Classification Search
CPC ...... B60Q 1/115; B60Q 1/0023; B60Q 1/085; B60Q 2300/112; B60Q 2300/114;
(Continued)

(56) References Cited

U.S. PATENT DOCUMENTS

| 6,130,506 A * | 10/2000 | Lopez | B60Q 1/0023 307/10.8 |
| 6,193,398 B1 * | 2/2001 | Okuchi | B60Q 1/115 362/276 |
| 2015/0291082 A1 * | 10/2015 | Kasaba | B60Q 1/115 701/49 |

FOREIGN PATENT DOCUMENTS

| JP | 2009154736 A * | 7/2009 |
| JP | 2015-202757 A | 11/2015 |

OTHER PUBLICATIONS

English machine translation of Koichi (JP-2009154736-A) (Year: 2009).*
English machine translation of Koichi (Year: 2009).*

* cited by examiner

Primary Examiner — Geepy Pe
Assistant Examiner — Bakari Underwood
(74) Attorney, Agent, or Firm — Birch, Stewart, Kolasch & Birch, LLP

(57) ABSTRACT

An optical axis control apparatus is provided with a relative-road-surface-angle calculating unit which calculates a relative horizontal plane angle being an inclination angle of a vehicle with respect to a horizontal plane by using an output value of an acceleration sensor provided on the vehicle and calculates a relative road surface angle being an inclination angle of the vehicle with respect to a road surface by integrating an amount of change of the relative horizontal plane angle while the vehicle is stationary, a relative-road-surface-angle correcting unit which obtains braking information indicating an operation state of a brake device provided on the vehicle and corrects the relative road surface angle for a change in the braking information, and an optical axis control unit which controls an optical axis of headlights (Continued)

provided on the vehicle using the relative road surface angle corrected by the relative-road-surface-angle correcting unit.

11 Claims, 12 Drawing Sheets

(51) Int. Cl.
*B60Q 1/00* (2006.01)
*G01P 15/16* (2013.01)
(52) U.S. Cl.
CPC .. *B60Q 2300/112* (2013.01); *B60Q 2300/114* (2013.01); *B60Q 2300/116* (2013.01); *B60Q 2300/132* (2013.01); *B60Q 2300/324* (2013.01)
(58) Field of Classification Search
CPC ........ B60Q 2300/116; B60Q 2300/132; B60Q 2300/324; G01P 15/165
See application file for complete search history.

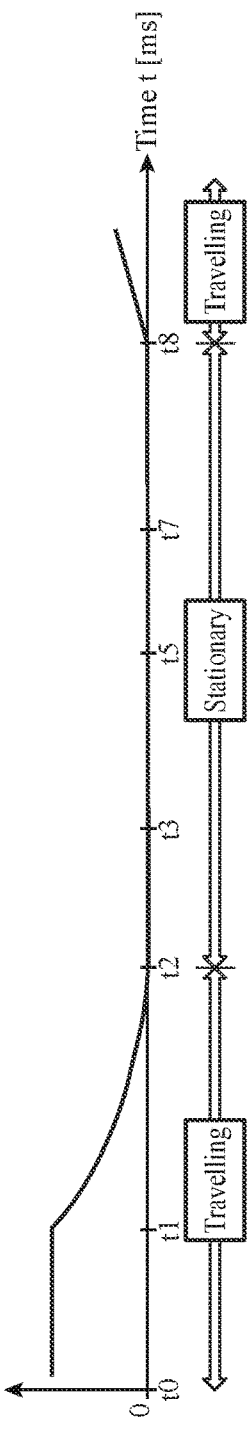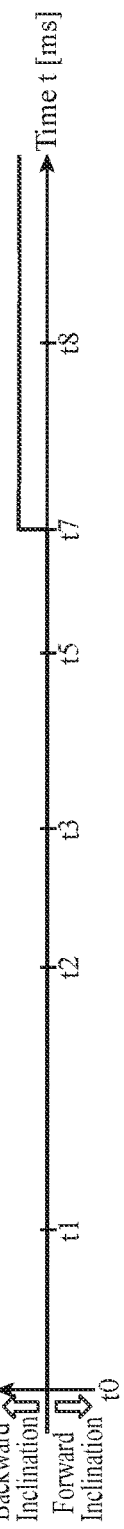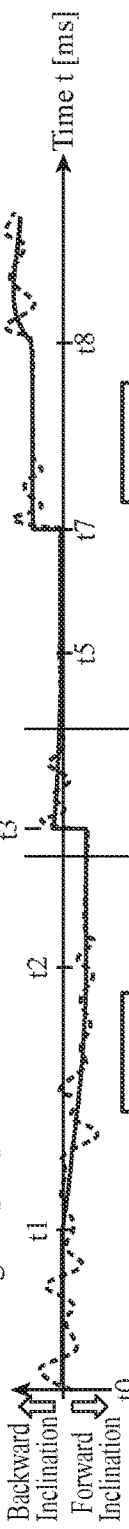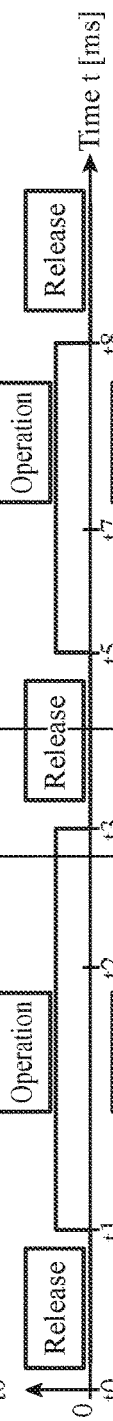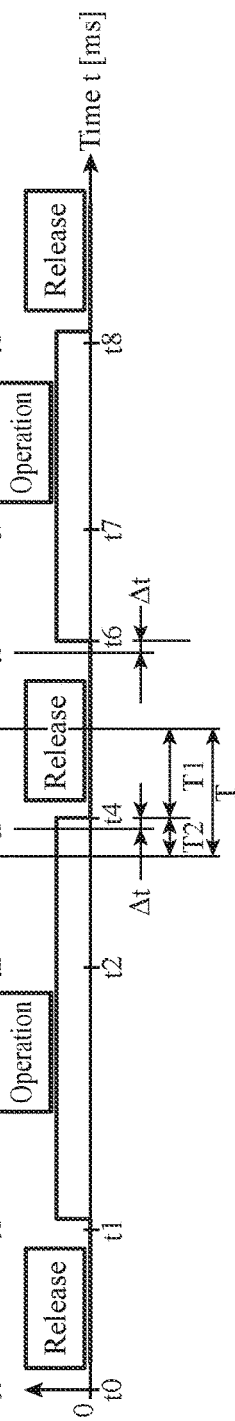

FIG. 14

| Change in Braking Information (Change in Operation State of Brake Device 5) | | | Foot Brake 2 Released | | Foot Brake 2 Released and Parking Brake 3 Activated | | Foot Brake 2 Released and Automatic Transmission 4 Set to P Range | | Automatic Transmission 4 Shifted from P Range to D Range While Parking Brake 3 Operates | |
|---|---|---|---|---|---|---|---|---|---|---|
| Drive System | Road Surface Gradient Angle θ1 | | Second Amount of Correction Δθ4 | | Second Amount of Correction Δθ4 | | Second Amount of Correction Δθ4 | | Second Amount of Correction Δθ4 | |
| | Inclining Direction | Angle Value (Absolute Value) [°] | Correction Direction | Degree [°] | Correction Direction | Degree [°] | Correction Direction | Degree [°] | Correction Direction | Degree [°] |
| Front-Wheel Drive | Upward | ≥3 | Not Set | Not Set | FWD INCL | −0.1 | BKWD INCL | +0.8 | BKWD INCL | +0.3 |
| | Upward | 2-3 | Not Set | Not Set | — | 0 | BKWD INCL | +0.7 | BKWD INCL | +0.2 |
| | Upward | 1-2 | Not Set | Not Set | BKWD INCL | +0.2 | BKWD INCL | +0.6 | BKWD INCL | +0.1 |
| | Upward | <1 | BKWD INCL | +0.5 | BKWD INCL | +0.5 | BKWD INCL | +0.5 | — | 0 |
| | Downward | <1 | BKWD INCL | +0.5 | BKWD INCL | +0.5 | BKWD INCL | +0.5 | — | 0 |
| | Downward | 1-2 | Not Set | Not Set | BKWD INCL | +0.8 | BKWD INCL | +0.4 | FWD INCL | −0.1 |
| | Downward | 2-3 | Not Set | Not Set | BKWD INCL | +1.0 | BKWD INCL | +0.3 | FWD INCL | −0.2 |
| | Downward | ≥3 | Not Set | Not Set | BKWD INCL | +1.1 | BKWD INCL | +0.2 | FWD INCL | −0.3 |
| Rear-Wheel Drive | Upward | ≥3 | Not Set | Not Set | — | 0 | BKWD INCL | +0.2 | — | 0 |
| | Upward | 2-3 | Not Set | Not Set | BKWD INCL | +0.1 | BKWD INCL | +0.3 | — | 0 |
| | Upward | 1-2 | Not Set | Not Set | BKWD INCL | +0.3 | BKWD INCL | +0.4 | — | 0 |
| | Upward | <1 | BKWD INCL | +0.5 | BKWD INCL | +0.5 | BKWD INCL | +0.5 | — | 0 |
| | Downward | <1 | BKWD INCL | +0.5 | BKWD INCL | +0.5 | BKWD INCL | +0.5 | — | 0 |
| | Downward | 1-2 | Not Set | Not Set | BKWD INCL | +0.7 | BKWD INCL | +0.6 | — | 0 |
| | Downward | 2-3 | Not Set | Not Set | BKWD INCL | +0.9 | BKWD INCL | +0.7 | — | 0 |
| | Downward | ≥3 | Not Set | Not Set | BKWD INCL | +1.0 | BKWD INCL | +0.8 | — | 0 |

OPTICAL AXIS CONTROL APPARATUS

TECHNICAL FIELD

The present disclosure relates to optical axis control apparatuses for headlights.

BACKGROUND ART

Generally, an inclination angle in a front-back direction of a vehicle with respect to a horizontal plane (hereinafter referred to as a "relative horizontal plane angle") is a sum of an inclination angle in a front-back direction of a road surface relative to the horizontal plane (hereinafter, referred to as a "road surface gradient angle") and an inclination angle in the front-back direction of the vehicle relative to the road surface (hereinafter, referred to as a "relative road surface angle"). Conventionally, a control apparatus which calculates a relative road surface angle using an acceleration sensor and controls an optical axis angle of a headlight with respect to the road surface (hereinafter, simply referred to as an "optical axis angle") to a constant value on the basis of the calculated relative road surface angle, a so-called "auto levelizer" is developed (refer to, for example, Patent Literature 1).

The control apparatus of Patent Literature 1, using an output value of the acceleration sensor, calculates a relative horizontal plane angle while the vehicle is travelling or stationary. The control apparatus of Patent Literature 1 derives the relative road surface angle from the relative horizontal plane angle by estimating that a change in the relative horizontal plane angle while traveling is the change in the road surface gradient angle and also estimating that a change in the relative horizontal plane angle while being stationary is the change in the relative road surface angle (refer to paragraphs [0028] to [0030] and other related paragraphs of Patent Literature 1).

Also, when receiving a switching signal of a foot brake, a parking brake, or a shift position while the vehicle is stationary, the control apparatus of Patent Literature 1 avoids an output of an adjusting signal to adjust the optical axis angle or outputs a maintaining signal to maintain the optical axis angle. As a result, the change in the relative horizontal plane angle caused by switching of the foot brake, the parking brake, or the shift position is excluded from the object of the optical axis adjustment, thereby improving accuracy of auto leveling control (refer to paragraphs [0038] to [0044] and other related paragraphs of Patent Literature 1).

CITATION LIST

Patent Literatures

Patent Literature 1: JP 2015-202757 A

SUMMARY OF INVENTION

Technical Problem

The control apparatus of Patent Literature 1 avoids outputting the adjusting signal or outputs the maintaining signal when receiving the switching signal of the foot brake, the parking brake, or the shift position while the vehicle is stationary. In this configuration, processing expandability is low, and thus there is a problem that flexible response cannot be provided in the event that an operation state of the brake device changes. For example, flexible response cannot be provided according to how such a change is made.

An aspect of embodiments according to the present disclosure is made to solve the above-described problems, and an object of the embodiments is to make it possible to variously respond to changes in the operation state of a brake device, in an optical axis control apparatus which calculates a relative road surface angle by integrating an amount of change of a relative horizontal plane angle while the vehicle is stationary.

Solution to Problem

An optical axis control apparatus according to the present disclosure is provided with a relative-road-surface-angle calculating unit for calculating a relative horizontal plane angle being an inclination angle of a vehicle with respect to a horizontal plane by using an output value of an acceleration sensor provided on the vehicle, and for calculating a relative road surface angle being an inclination angle of the vehicle with respect to a road surface by integrating an amount of change of the relative horizontal plane angle, while the vehicle is stationary; a relative-road-surface-angle correcting unit for obtaining braking information indicating an operation state of a brake device provided on the vehicle, and for correcting the relative road surface angle in response to a change in the braking information; and an optical axis control unit for controlling an optical axis of a headlight provided on the vehicle by using the relative road surface angle corrected by the relative-road-surface-angle correcting unit.

Advantageous Effects of Invention

In the event that an operation state of a brake device of a vehicle changes while the vehicle is stationary, an optical axis control apparatus according to the present disclosure may respond to the change variously depending on the correction made by a relative-road-surface-angle correcting unit.

BRIEF DESCRIPTION OF DRAWINGS

FIG. 11A is a characteristic diagram illustrating a travel speed of the vehicle with respect to time. FIG. 11B is a characteristic diagram illustrating an ideal relative road surface angle which is a calculation object of a relative-road-surface-angle calculating unit. FIG. 11C is a characteristic diagram illustrating a relative horizontal plane angle obtained by removing an effect of vibration of a vehicle body and a relative horizontal plane angle with the effect of the vibration of the vehicle body. FIG. 11D is a timing chart illustrating an actual operation state of a foot brake. FIG. 11E is a timing chart illustrating an operation state of the foot brake indicated by braking information.

FIG. 14 is an illustrative view illustrating examples of a second amount of correction according to Embodiment 2 of the present disclosure.

DESCRIPTION OF EMBODIMENTS

Hereinafter, to explain this application in more detail, embodiments according to the present disclosure are explained with reference to the accompanying drawings.

Embodiment 1

Figure 1:
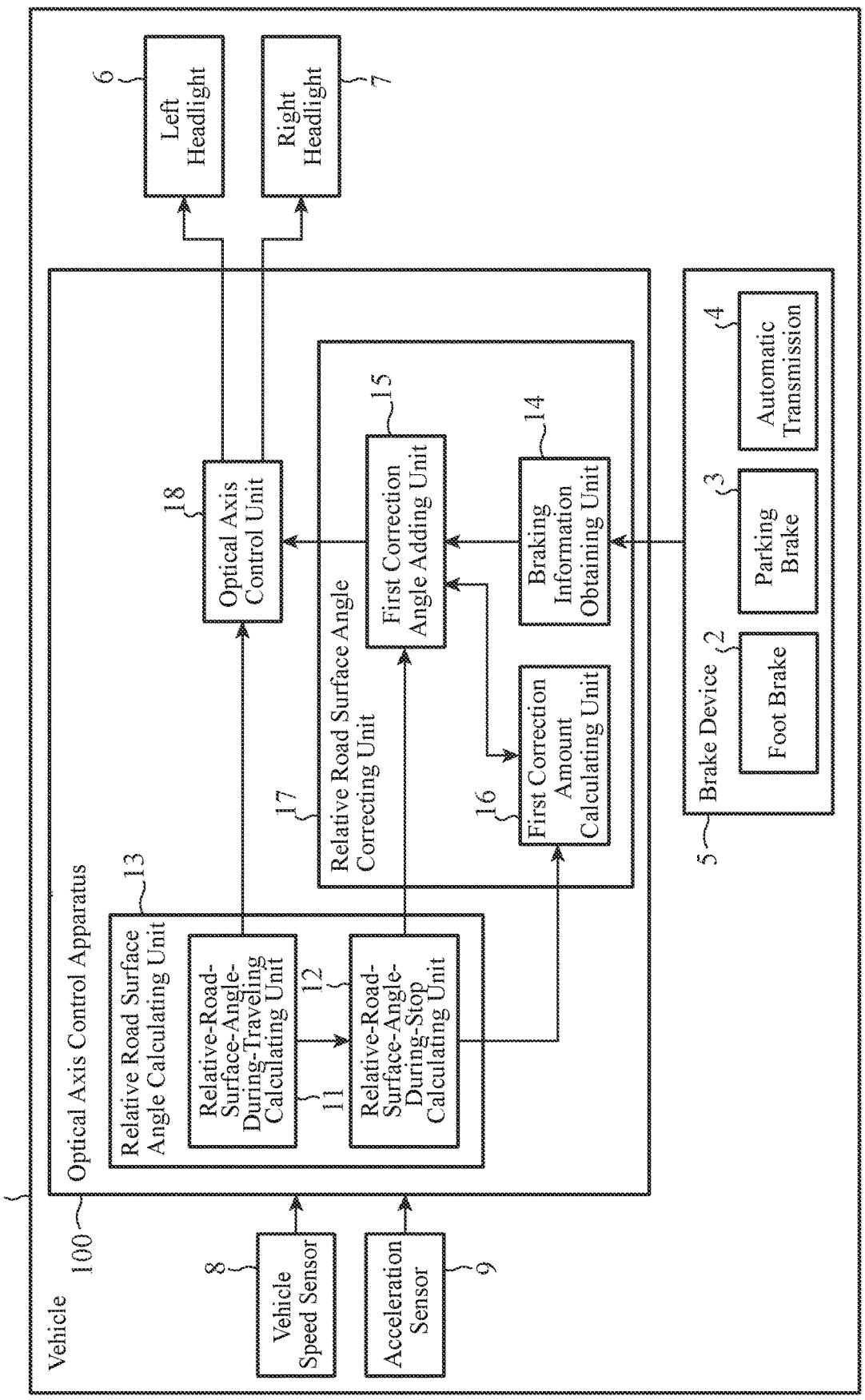
FIG. 1 is a functional block diagram illustrating a substantial part of an optical axis control apparatus according to Embodiment 1 of the present disclosure.
Figure 2:
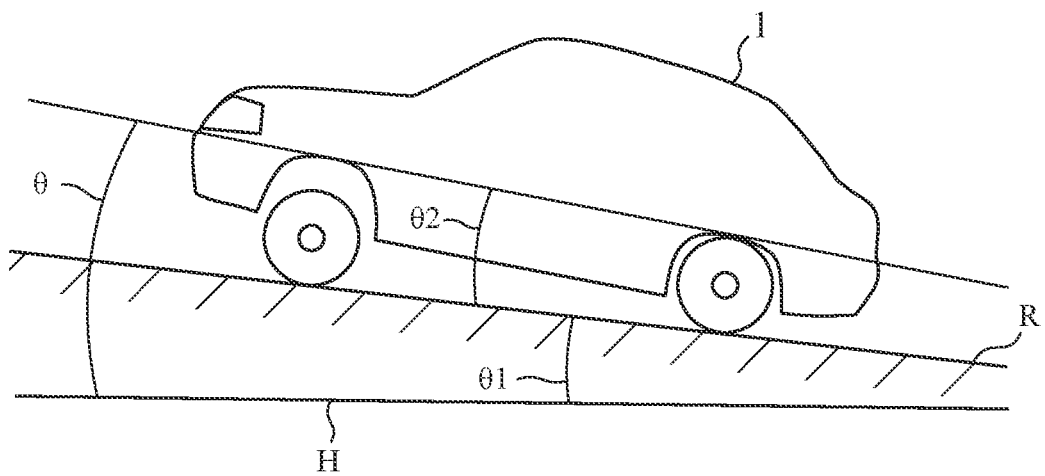
FIG. 2 is an illustrative view illustrating an example of a road surface gradient angle, a relative road surface angle, and a relative horizontal plane angle.
Figure 3:
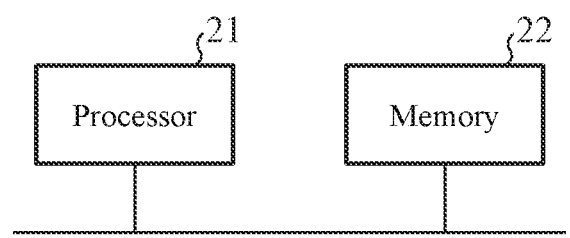
FIG. 3 is a hardware configuration diagram illustrating a substantial part of the optical axis control apparatus according to Embodiment 1 of the present disclosure.
Figure 4:
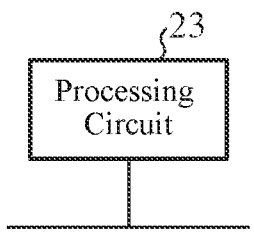
FIG. 4 is another hardware configuration diagram illustrating the substantial part of the optical axis control apparatus according to Embodiment 1 of the present disclosure.
Figure 5:
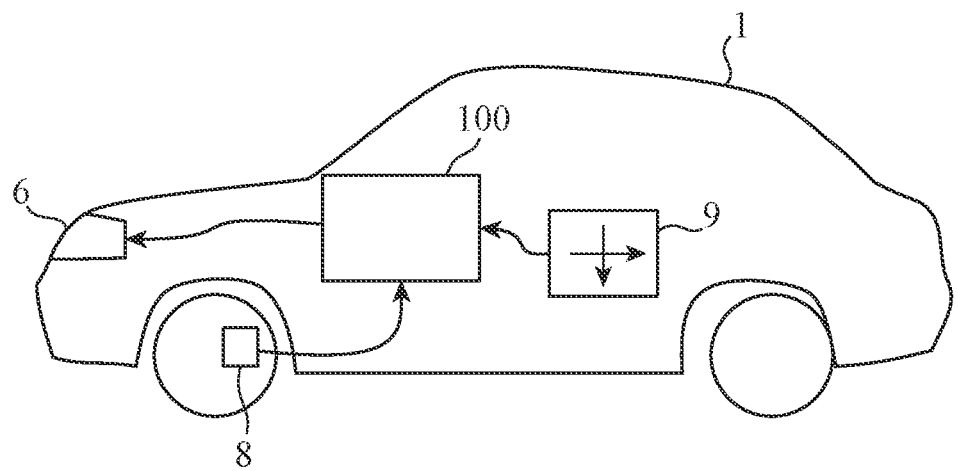
FIG. 5 is an illustrative view illustrating a state in which the optical axis control apparatus according to Embodiment 1 of the present disclosure is mounted on a vehicle.
Figure 6:
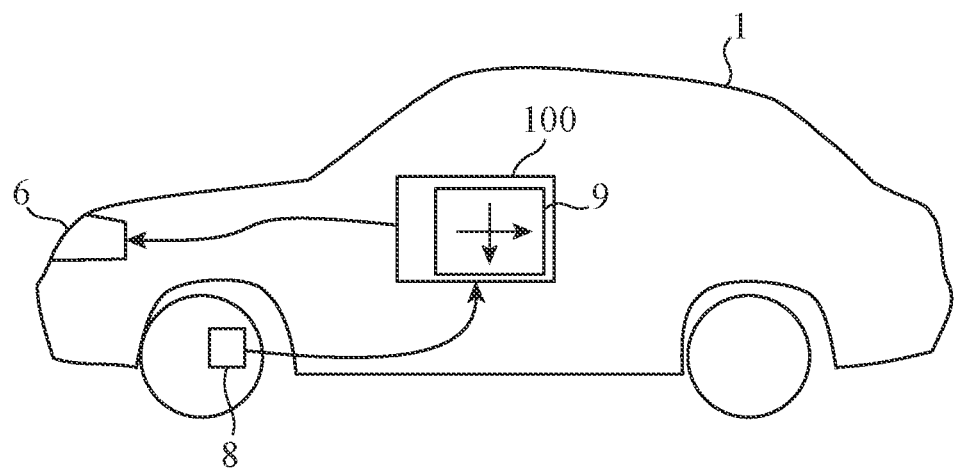
FIG. 6 is an illustrative view illustrating another state in which the optical axis control apparatus according to Embodiment 1 of the present disclosure is mounted on the vehicle.
Figure 7:
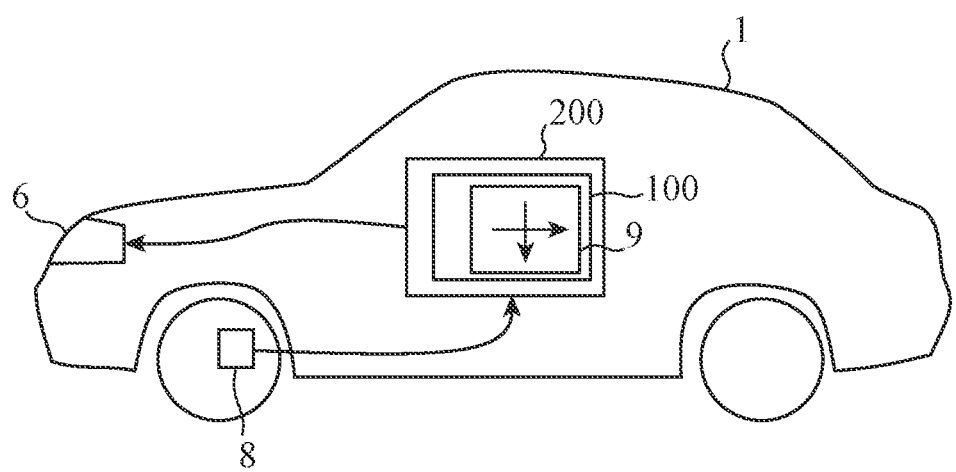
FIG. 7 is an illustrative view illustrating another state in which the optical axis control apparatus according to Embodiment 1 of the present disclosure is mounted on the vehicle.

FIG. 1 is a functional block diagram illustrating a substantial part of an optical axis control apparatus according to Embodiment 1 of the present disclosure. FIG. 2 is an illustrative view illustrating an example of a road surface gradient angle, a relative road surface angle, and a relative horizontal plane angle. FIG. 3 is a hardware configuration diagram illustrating a substantial part of the optical axis control apparatus according to Embodiment 1 of the present disclosure. FIG. 4 is another hardware configuration diagram illustrating the substantial part of the optical axis control apparatus according to Embodiment 1 of the present disclosure. FIG. 5 is an illustrative view illustrating a state in which the optical axis control apparatus according to Embodiment 1 of the present disclosure is mounted on a vehicle. FIG. 6 is an illustrative view illustrating another state in which the optical axis control apparatus according to Embodiment 1 of the present disclosure is mounted on the vehicle. FIG. 7 is an illustrative view illustrating another state in which the optical axis control apparatus according to Embodiment 1 of the present disclosure is mounted on the vehicle. An optical axis control apparatus 100 according to Embodiment 1 is described with reference to FIGS. 1 to 7.

A foot brake 2 includes, for example, a disc brake provided for a front wheel portion of a vehicle 1, and a disc brake or drum brake provided for a rear wheel portion of the vehicle 1. The disc brake causes the brake pads to sandwich the disc rotating integrally with the wheel of the vehicle 1, and the friction between the disc and the brake pads stops the rotation of the wheel. The drum brake presses a brake shoe against a drum rotating integrally with the wheel of the vehicle 1, and the friction between the drum and the brake shoe stops the rotation of the wheel.

A parking brake 3 includes, for example, a drum brake provided for the rear wheel portion of the vehicle 1. The drum brake for the parking brake 3 is different from the drum brake for the foot brake 2, and both drum brakes are provided independently from each other. Note that if a vehicle 1 is a small or medium-sized truck, the parking brake 3 may be implemented with a so-called "center brake," which is a drum brake for stopping rotation of a propeller shaft.

An automatic transmission 4 stops rotation of a shaft by engaging a click with a gear in the transmission, thereby stopping the rotation of the wheel, when being set to a parking range (hereinafter referred to as a "P range") by operation of a driver. Specifically, the rotation of the front wheels is stopped in a case in which the vehicle 1 is a front-wheel drive vehicle, the rotation of the rear wheels is stopped in a case in which the vehicle 1 is a rear-wheel drive vehicle, and the rotation of the front and rear wheels are stopped in a case in which the vehicle 1 is a four-wheel drive vehicle.

The foot brake 2, the parking brake 3 and the automatic transmission 4A compose the brake device 5. Note that the vehicle 1 may include a manual transmission instead of the automatic transmission 4, and that the foot brake 2 and the parking brake 3 may compose the brake device 5.

A left headlight 6 is provided on a left end of a front end of the vehicle 1 and a right headlight 7 is provided on a right end of the front end of the vehicle 1. An optical axis angle of the left headlight 6 and that of the right headlight 7 are variable, and the optical axis angles are controlled by the optical axis control apparatus 100. Hereinafter, the left headlight 6 and the right headlight 7 may be collectively referred to as "headlights" simply.

A vehicle speed sensor 8 is provided at the front wheel portion or the rear wheel portion of the vehicle 1 and outputs a pulse signal corresponding to a rotation speed of the wheel, that is, a so-called "vehicle speed signal". The vehicle speed signal is used in the optical axis control apparatus 100 to determine whether the vehicle 1 is travelling or to determine whether the vehicle 1 is stationary.

An acceleration sensor 9 detects acceleration Gx in a front-back direction of a vehicle body of the vehicle and acceleration Gz in a vertical direction of the vehicle body of the vehicle 1. The acceleration sensor 9 detects the accelerations Gx and Gz at predetermined time intervals and outputs values of the detected accelerations Gx and Gz. The output values of the acceleration sensor 9 are used in the optical axis control apparatus 100 for calculating a relative road surface angle θ2 or calculating a relative horizontal plane angle θ.

FIG. 2 illustrates an example of a road surface gradient angle θ1, the relative road surface angle θ2, and the relative horizontal plane angle θ. As illustrated in FIG. 2, a road surface R is an upward slope. Also, loads not illustrated are loaded on a trunk of the vehicle 1 and the vehicle 1 inclines backward by the weight of the loads. As illustrated in FIG. 2, the relative horizontal plane angle θ with respect to a horizontal plane H is represented by a sum of the road surface gradient angle $\theta 1$ and the relative road surface angle $\theta 2$.

Hereinafter, it is assumed that angle in a backward inclining direction of the vehicle 1 is positive and angle in a forward inclining direction of the vehicle 1 is negative relative to the horizontal plane H being a reference. In a state illustrated in FIG. 2, the road surface gradient angle $\theta 1$, the relative road surface angle $\theta 2$, and the relative horizontal plane angle $\theta$ are all positive values. Unless otherwise specified, a unit of angle shall be radian (rad). That is, a maximum value of the relative horizontal plane angle $\theta$ is $\pi/2$ [rad] and a minimum value thereof is $-\pi/2$ [rad].

A relative-road-surface-angle-during-traveling calculating unit 11 calculates the relative road surface angle $\theta 2$ using the output value of the acceleration sensor 9 while the vehicle 1 travels. The relative-road-surface-angle-during-traveling calculating unit 11 outputs the calculated relative road surface angle $\theta 2$ to the optical axis control unit 18. Operation of the relative-road-surface-angle-during-traveling calculating unit 11 is described later in detail with reference to a flowchart of FIG. 8.

When the vehicle 1 is stationary, a relative-road-surface-angle-during-stop calculating unit 12 calculates the relative horizontal plane angle $\theta$ by using output values of the acceleration sensor 9. The relative-road-surface-angle-during-stop calculating unit 12 calculates amounts of change $\Delta\theta$ in the relative horizontal plane angle $\theta$ and calculates the relative road surface angle $\theta 2$ by integrating the amounts of change $\Delta\theta$. The relative-road-surface-angle-during-stop calculating unit 12 outputs the calculated amounts of change $\Delta\theta$ to a first correction amount calculating unit 16 and outputs the calculated relative road surface angle $\theta 2$ to a first correction angle adding unit 15. Operation of the relative-road-surface-angle-during-stop calculating unit 12 is described later in detail with reference to a flowchart of FIG. 9.

The relative-road-surface-angle-during-traveling calculating unit 11 and the relative-road-surface-angle-during-stop calculating unit 12 compose a relative-road-surface-angle calculating unit 13.

A braking information obtaining unit 14 obtains information indicating an operation state of the brake device 5 (hereinafter referred to as "braking information") from the brake device 5. Specifically, the braking information is, for example, the information indicating whether the foot brake 2 is in operation, whether the parking brake 3 is in operation, and whether the automatic transmission 4 is set to the P range. The braking information obtaining unit 14 outputs the obtained braking information to the first correction angle adding unit 15.

The first correction angle adding unit 15 holds a value of an angle (hereinafter referred to as a "first correcting angle") $\theta 3$ used for correcting the relative road surface angle $\theta 2$ calculated by the relative-road-surface-angle-during-stop calculating unit 12. An initial value of the first correction angle $\theta 3$ is set to zero, for example. The first correction angle adding unit 15 adds the first correction angle $\theta 3$ to the relative road surface angle $\theta 2$ input from the relative-road-surface-angle-during-stop calculating unit 12 and outputs the relative road surface angle $\theta 2$ after addition to the optical axis control unit 18.

The first correction angle adding unit 15 monitors the braking information input from the braking information obtaining unit 14 and detects a change in the braking information. When the braking information changes, the first correction angle adding unit 15 instructs the first correction amount calculating unit 16 to calculate a correcting amount (hereinafter referred to as "first amount of correction") $\Delta\theta 3$ which cancels out the amount of change $\Delta\theta$ in a time section T including a time point at which the braking information changes. This time section T includes a first time section T1 of a predetermined length (for example, 500 milliseconds) after the time point at which the braking information changes and a second time section T2 of a predetermined length (for example, 100 milliseconds) before the time point at which the braking information changes.

The first correction amount calculating unit 16 accumulates amounts of change $\Delta\theta$ input from the relative-road-surface-angle-during-stop calculating unit 12 to store. The first correction amount calculating unit 16 calculates the sum of the amount of changes $\Delta\theta$ in the time section T and calculates the first amount of correction $\Delta\theta 3$ by inverting the positive/negative sign of the sum. The first correction amount calculating unit 16 outputs the calculated first amount of correction $\Delta\theta 3$ to the first correction angle adding unit 15.

When the first correction angle adding unit 15 receives the first amount of correction $\Delta\theta 3$ from the first correction amount calculating unit 16, it updates the first correction angle $\theta 3$ by adding the first amount of correction $\Delta\theta 3$ to the previous first correction angle $\theta 3$. Thereafter, the first correction angle adding unit 15 maintains the value of the first correction angle $\theta 3$ until next update of the first correction angle $\theta 3$ while the vehicle 1 is stationary. That is, the addition of the first correction angle $\theta 3$ is correction to cancel out the amount of change $\Delta\theta$ in the time section T.

The braking information obtaining unit 14, the first correction angle adding unit 15, and the first correction amount calculating unit 16 compose a relative-road-surface-angle correcting unit 17. Operation of the relative-road-surface-angle correcting unit 17 is described later in detail with reference to a flowchart of FIG. 10.

The optical axis control unit 18 controls the optical axis angles of the headlights 6 and 7 using the relative road surface angle $\theta 2$ input from the relative-road-surface-angle-during-traveling calculating unit 11 or the relative road surface angle $\theta 2$ input from the first correction angle adding unit 15. Specifically, a target value for the optical axis angles of the headlights 6 and 7 is set in advance in the optical axis control unit 18. The optical axis control unit 18 controls the optical axis angles of the headlights 6 and 7 so that the optical axis angles of the headlights 6 and 7 are maintained constant at the target value on the basis of the input relative road surface angle $\theta 2$.

Although the target value of the optical axis angle may be any value, this is preferably set to be slightly depressed from a direction parallel to the road surface R from the viewpoint of preventing dazzling of an opposed vehicle by the headlights 6 and 7 and preventing hardness of the driver of the vehicle 1 of visually recognizing the front due to reflection of light of the headlights 6 and 7 by the road surface R.

The relative-road-surface-angle calculating unit 13, the relative-road-surface-angle correcting unit 17, and the optical axis control unit 18 compose the optical axis control apparatus 100.

While the vehicle 1 travels, the relative-road-surface-angle-during-traveling calculating unit 11 repeatedly executes a process of calculating the relative road surface angle $\theta 2$ to output to the optical axis control unit 18. The optical axis control unit 18 controls the optical axis angle of the headlights 6 and 7 on the basis of the latest relative road surface angle $\theta 2$ input from the relative-road-surface-angle-during-stop calculating unit 12 while the vehicle 1 travels.

While the vehicle 1 is stationary, the relative-road-surface-angle-during-stop calculating unit 12 repeatedly executes a process of calculating the relative road surface angle θ2 to output to the relative-road-surface-angle correcting unit 17. Each relative road surface angle θ2 output by the relative-road-surface-angle-during-stop calculating unit 12 to the relative-road-surface-angle correcting unit 17 and the output of each relative road surface angle θ2 output by the relative-road-surface-angle correcting unit 17 to the optical axis control unit 18 correspond one to one. That is, each time the relative-road-surface-angle-during-stop calculating unit 12 outputs the relative road surface angle θ2 to the relative-road-surface-angle correcting unit 17, the relative-road-surface-angle correcting unit 17 outputs the corrected relative road surface angle θ2 to the optical axis control unit 18. The optical axis control unit 18 controls the optical axis angle of the headlights 6 and 7 on the basis of latest relative road surface angle θ2 input from the relative-road-surface-angle correcting unit 17 while the vehicle 1 stops.

FIG. 3 illustrates an example of a hardware configuration of the optical axis control apparatus 100. As illustrated in FIG. 3, the optical axis control apparatus 100 is implemented by a computer including a processor 21 and a memory 22. The memory 22 stores a program for allowing the computer to serve as the relative-road-surface-angle calculating unit 13, the relative-road-surface-angle correcting unit 17, and the optical axis control unit 18 illustrated in FIG. 1. When the processor 21 reads out the program stored in the memory 22 to execute, functions of the relative-road-surface-angle calculating unit 13, the relative-road-surface-angle correcting unit 17, and the optical axis control unit 18 illustrated in FIG. 1 are carried out.

The processor 21 is, for example, a central processing unit (CPU), a digital signal processor (DSP), a microcontroller, a microprocessor or the like. The memory 22 is, for example, a semiconductor memory such as a random access memory (RAM), a read only memory (ROM), a flash memory, an erasable programmable read only memory (EPROM), or an electrically erasable programmable read only memory (EEPROM).

Alternatively, as illustrated in FIG. 4, the optical axis control apparatus 100 is implemented by a dedicated processing circuit 23. The processing circuit 23 is, for example, an application specific integrated circuit (ASIC), a field-programmable gate array (FPGA), a system large-scale integration (LSI), or a combination thereof. Note that each of the functions of the relative-road-surface-angle calculating unit 13, the relative-road-surface-angle correcting unit 17, and the optical axis control unit 18 illustrated in FIG. 1 may be implemented by respective processing circuit, or the functions of the respective units may be collectively implemented by a processing circuit.

Alternatively, it is also possible that some functions of the relative-road-surface-angle calculating unit 13, the relative-road-surface-angle correcting unit 17, and the optical axis control unit 18 illustrated in FIG. 1 are implemented by the processor 21 and the memory 22 illustrated in FIG. 3, and remaining functions are implemented by the processing circuit 23 illustrated in FIG. 4.

The acceleration sensor 9 may be provided separately from the optical axis control apparatus 100 as illustrated in FIG. 5, or may be provided integrally with the optical axis control apparatus 100 as illustrated in FIG. 6. By integrally forming the acceleration sensor 9 and the optical axis control apparatus 100, a harness or the like for connecting the acceleration sensor 9 and the optical axis control apparatus 100 is unnecessary, and it becomes possible to simplify a structure of the vehicle 1 to reduce a manufacturing cost of the vehicle 1.

Also, as illustrated in FIG. 7, the optical axis control apparatus 100 may be formed integrally with a control apparatus 200 which executes control different from the optical axis control of the headlights 6 and 7. By integrally forming the optical axis control apparatus 100 and the other control apparatus 200, it is possible to reduce the number of electronic devices mounted on the vehicle 1 and reduce the manufacturing cost of the vehicle 1.

Figure 8:
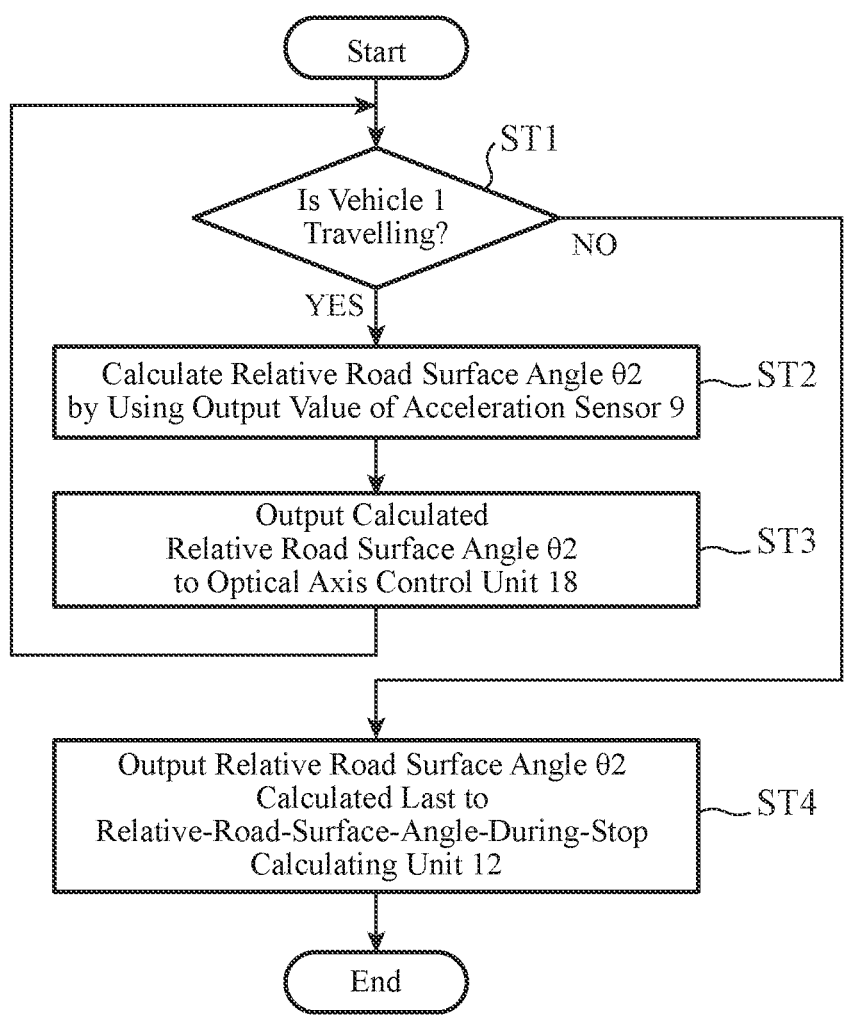
FIG. 8 is a flowchart illustrating operation of a relative-road-surface-angle-during-traveling calculating unit according to Embodiment 1 of the present disclosure.

Next, the operation of the relative-road-surface-angle-during-traveling calculating unit 11 is described with reference to the flowchart of FIG. 8.

At step ST1, the relative-road-surface-angle-during-traveling calculating unit 11, using the vehicle speed signal output from the vehicle speed sensor 8, determines whether the vehicle 1 is travelling. When the vehicle 1 is travelling ("YES" at step ST1), the relative-road-surface-angle-during-traveling calculating unit 11 calculates the relative road surface angle θ2 using the output value of the acceleration sensor 9 at step ST2.

Specifically, for example, the relative-road-surface-angle-during-traveling calculating unit 11 calculates an amount of change ΔGz between accelerations Gz1 and Gz2 in the vertical direction detected by the acceleration sensor 9 at two different time points, in accordance with Equation (1) below. One acceleration Gz1 is, for example, a value detected at the time of most recent stop or constant speed travel. The other acceleration Gz2 is, for example, the latest value detected at the time of most recent acceleration or deceleration. Also, the relative-road-surface-angle-during-traveling calculating unit 11 calculates an amount of change ΔGx between accelerations Gx1 and Gx2 in the front-back direction detected at the two time points in accordance with Equation (2) below. The relative-road-surface-angle-during-traveling calculating unit 11 calculates the relative road surface angle θ2 using Equation (3) below.

$$\Delta Gz = Gz2 - Gz1 \tag{1}$$

$$\Delta Gx = Gx2 - Gx \tag{2}$$

$$\theta 2 = \tan^{-1}(\Delta Gz/\Delta Gx) \tag{3}$$

In this manner, while the vehicle 1 is travelling, it is possible to calculate the relative road surface angle θ2 regardless of the road surface gradient angle θ1 without using the acceleration sensor 9 as an inclination sensor, that is, without calculating the relative horizontal plane angle θ by using the output value of the acceleration sensor 9. Also, it is possible to calculate the relative road surface angle θ2 without being affected by offset variation of the acceleration sensor 9 or a change with time of the offset by calculating the relative road surface angle θ2 using the amount of change ΔGz in the acceleration Gz in the vertical direction and the amount of change ΔGx in the acceleration Gx in the front-back direction.

In general, the vehicle 1 inclines backward during acceleration and inclines forward during deceleration. The relative road surface angle θ2 calculated in accordance with Eqs. (1) through (3) described above includes an inclination component due to the acceleration and deceleration of the vehicle 1. Hence, the relative-road-surface-angle-during-traveling calculating unit 11 may calculate the relative road surface angle θ2 by using the amount of changes ΔGx and ΔGz in the accelerations Gx and Gz detected by the acceleration sensor 9 at three or more different time points as in the case of the two time points described above. By increasing the number of accelerations Gx and Gz used for the calculation, it is possible to reduce the inclination component due to the acceleration and deceleration of the vehicle 1 included in the calculated relative road surface angle θ2. As a result, it is possible to prevent the optical axis angle after the control by the optical axis control unit 18 from deviating from the target value depending on the inclination by the acceleration and deceleration of the vehicle 1.

Next, at step ST3, the relative-road-surface-angle-during-traveling calculating unit 11 outputs the relative road surface angle θ2 calculated at step ST2 to the optical axis control unit 18. Next, the relative-road-surface-angle-during-traveling calculating unit 11 returns to step ST1.

In this manner, the relative-road-surface-angle-during-traveling calculating unit 11 repeatedly executes the processes at steps ST2 and ST3 while the vehicle 1 travels ("YES" at step ST1). The optical axis control unit 18 controls the optical axis angle of the headlights 6 and 7 based on the latest relative road surface angle θ2 input from the relative-road-surface-angle-during-traveling calculating unit 11 while the vehicle 1 is travelling.

When the vehicle 1 is stationary ("NO" at step ST1), the relative-road-surface-angle-during-traveling calculating unit 11 outputs the relative road surface angle θ2 calculated at step ST2 of a final round to the relative-road-surface-angle-during-stop calculating unit 12 at step ST4.

Figure 9:
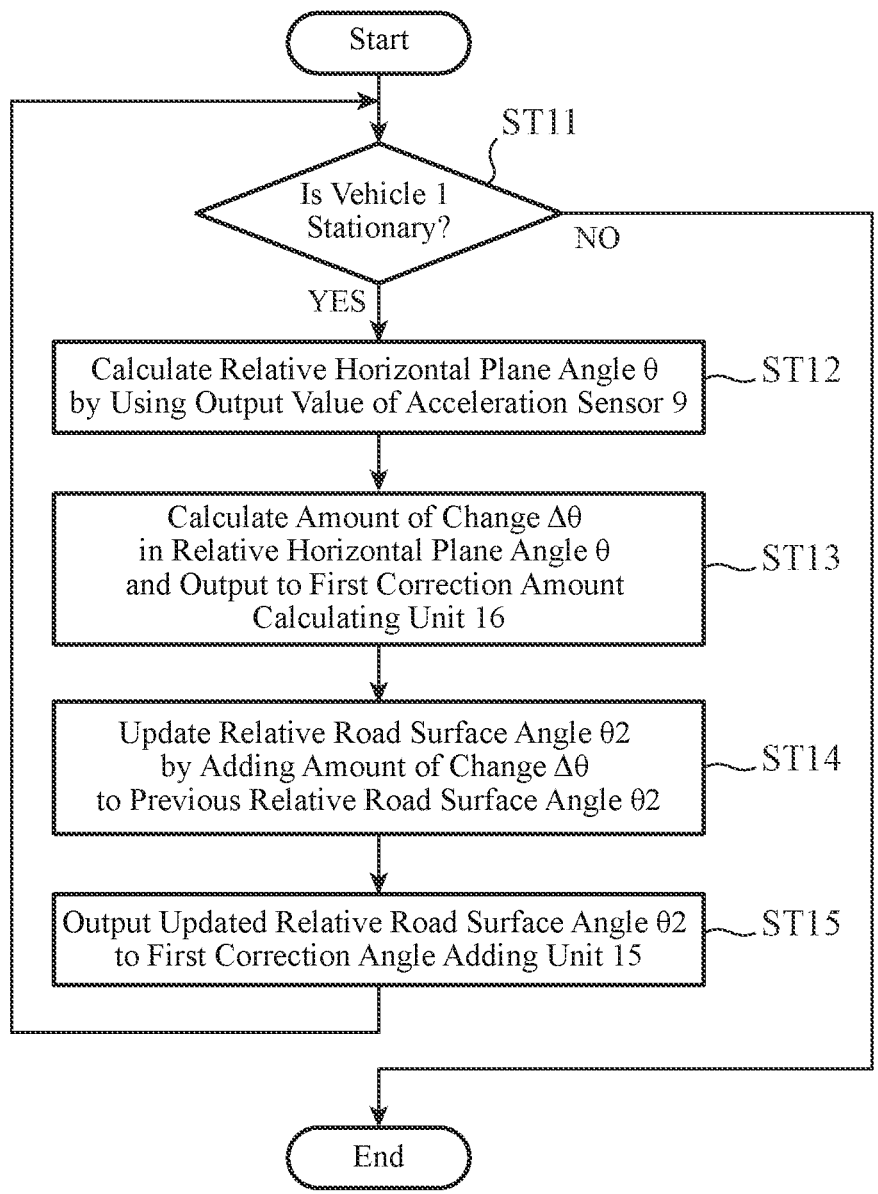
FIG. 9 is a flowchart illustrating operation of a relative-road-surface-angle-during-stop calculating unit according to Embodiment 1 of the present disclosure.

Next, the operation of the relative-road-surface-angle-during-stop calculating unit 12 is described with reference to the flowchart of FIG. 9.

First, at step ST11, the relative-road-surface-angle-during-stop calculating unit 12, using the vehicle speed signal output from the vehicle speed sensor 8, determines whether the vehicle 1 is stationary. When the vehicle 1 is stationary ("YES" at step ST11), the relative-road-surface-angle-during-stop calculating unit 12, using the output value of the acceleration sensor 9, calculates the relative horizontal plane angle θ at step ST12.

That is, the relative-road-surface-angle-during-stop calculating unit 12 calculates the relative horizontal plane angle θ by using the acceleration sensor 9 as the inclination sensor. Specifically, for example, the relative-road-surface-angle-during-stop calculating unit 12, using the latest accelerations Gx and Gz detected by the acceleration sensor 9, calculates the relative horizontal plane angle θ in accordance with Equation (4) below.

$$\theta = \tan^{-1}(Gx/Gz) \quad (4)$$

After calculating the relative horizontal plane angle θ, the relative-road-surface-angle-during-stop calculating unit 12 proceeds to step ST13. At that time, the relative-road-surface-angle-during-stop calculating unit 12, using a so-called "flag", checks whether the relative horizontal plane angle θ is calculated for the first time after the vehicle 1 stops. When the relative horizontal plane angle θ is calculated for the first time, the relative-road-surface-angle-during-stop calculating unit 12 executes the process at step ST12 again and then proceeds to step ST13.

Next, at step ST13, the relative-road-surface-angle-during-stop calculating unit 12 calculates the amount of change Δθ in the relative horizontal plane angle θ calculated at step ST12 of most recent two rounds. The relative-road-surface-angle-during-stop calculating unit 12 outputs the calculated amount of change Δθ to the first correction amount calculating unit 16.

Next, at step ST14, the relative-road-surface-angle-during-stop calculating unit 12 updates the relative road surface angle θ2 by adding the amount of change Δθ calculated at step ST13 to the previous relative road surface angle θ2. Herein, the "previous relative road surface angle θ2" at step ST14 of a first round after the vehicle 1 stops is the relative road surface angle θ2 input from the relative-road-surface-angle-during-traveling calculating unit 11 at step ST4 of FIG. 8. The "previous relative road surface angle θ2" at step ST14 of second and subsequent rounds after the vehicle 1 stops is the updated relative road surface angle θ2 at step ST14 of a previous round.

Next, at step ST15, the relative-road-surface-angle-during-stop calculating unit 12 outputs the updated relative road surface angle θ2 at step ST14 to the first correction angle adding unit 15. Then, the relative-road-surface-angle-during-stop calculating unit 12 returns to step ST11. In this manner, the relative-road-surface-angle-during-stop calculating unit 12 repeatedly executes the processes of steps ST12 to ST15 while the vehicle 1 is stationary ("YES" at step ST11) and calculates the relative road surface angle θ2 by integrating the amount of change Δθ.

Figure 10:
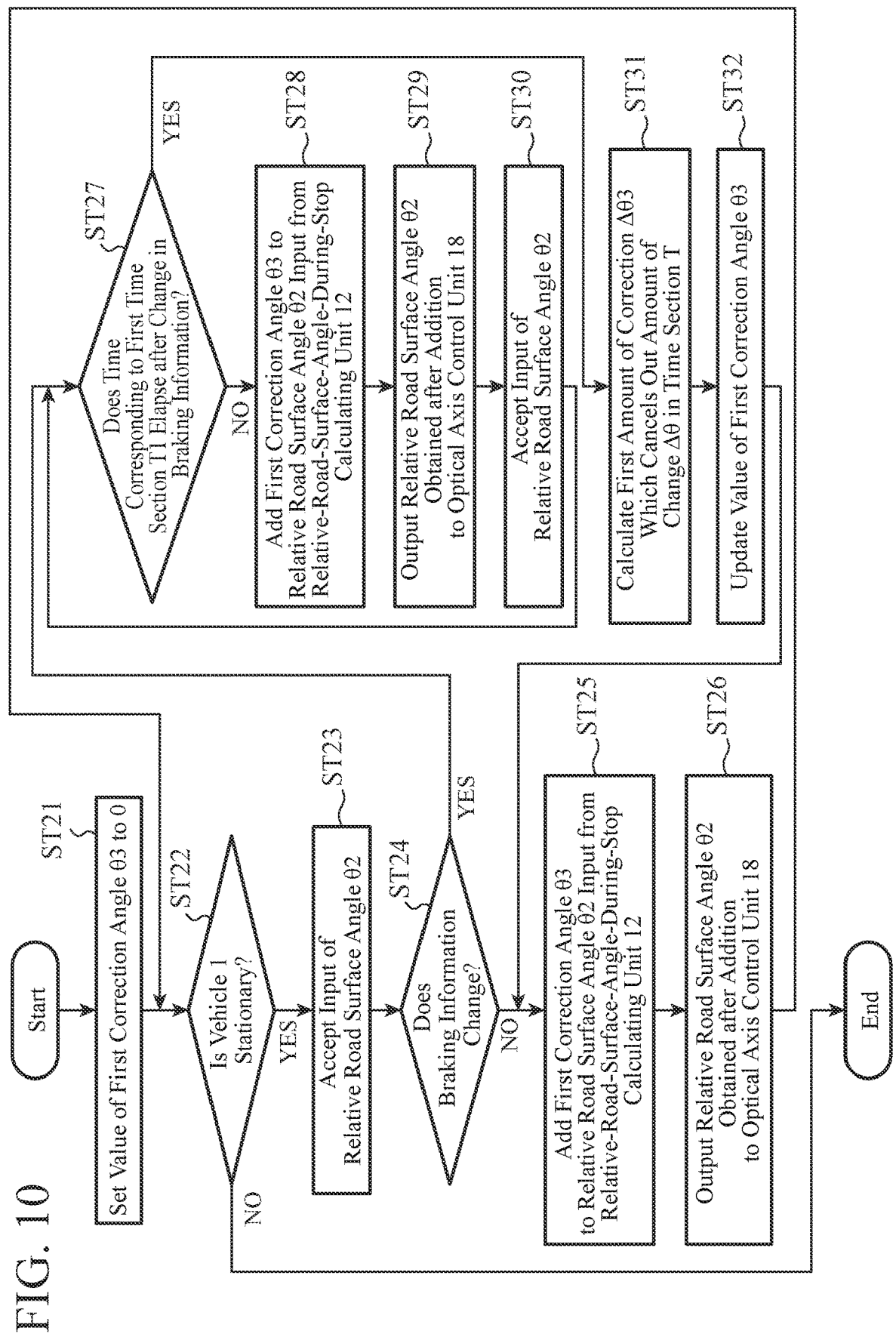
FIG. 10 is a flowchart illustrating operation of a relative road surface angle correcting unit according to Embodiment 1 of the present disclosure.

Next, with reference to the flowchart of FIG. 10, operation of the relative-road-surface-angle correcting unit 17 is described, focusing on operation of the first correction angle adding unit 15 and the first correction amount calculating unit 16. Note that a time interval in which the relative-road-surface-angle-during-stop calculating unit 12 calculates the relative road surface angle θ2 to output it to the first correction angle adding unit 15 is set to a value smaller than the first time section T1.

First, at step ST21, the first correction angle adding unit 15 sets the value of the first correction angle θ3 to the initial value, that is, zero. Thereafter, the first correction angle adding unit 15 maintains the value of the first correction angle θ3 to zero until the value of the first correction angle θ3 is updated at step ST32 to be described later.

Next, at step ST22, the first correction angle adding unit 15, using the vehicle speed signal output from the vehicle speed sensor 8, determines whether the vehicle 1 is stationary. When the vehicle 1 is stationary("YES" at step ST22), at step ST23, the first correction angle adding unit 15 accepts the input of the relative road surface angle θ2, which is output from the relative-road-surface-angle-during-stop calculating unit 12 at step ST15 of FIG. 9.

Next, at step ST24, the first correction angle adding unit 15 determines whether the braking information changes. That is, it is determined whether the braking information changes after the vehicle 1 stops at step ST24 of a first round after the vehicle 1 stops. At step ST24 of second and subsequent rounds after the vehicle 1 stops, it is determined whether the braking information changes after step ST24 of a previous round.

When the braking information does not change ("NO" at step ST24), at step ST25, the first correction angle adding unit 15 adds the first correction angle θ3 to the relative road surface angle θ2 that is input from the relative-road-surface-angle-during-stop calculating unit 12 at step ST23.

Next, at step ST26, the first correction angle adding unit 15 outputs the relative road surface angle θ2 obtained after addition at step ST25 to the optical axis control unit 18. Then, the first correction angle adding unit 15 returns to step ST22.

On the other hand, when the braking information changes ("YES" at step ST24), at step ST27, the first correction angle adding unit 15 determines whether a time corresponding to the first time section T1 elapses after the braking information changes. When the time corresponding to the first time section T1 does not elapse ("NO" at step ST27), at step ST28, the first correction angle adding unit 15 adds the first correction angle θ3 to the relative road surface angle θ2 that is input from the relative-road-surface-angle-during-stop calculating unit 12 at step ST23.

Next, at step ST29, the first correction angle adding unit 15 outputs the relative road surface angle θ2 obtained after addition at step ST28 to the optical axis control unit 18.

Next, at step ST30, the first correction angle adding unit 15 accepts an input of a new relative road surface angle θ2 from the relative-road-surface-angle-during-stop calculating unit 12. Thereafter, the first correction angle adding unit 15 repeatedly executes the processes of steps ST28 to ST30 until the time corresponding to the first time section T1 elapses after the braking information changes. Note that, at step ST28 in the second and subsequent rounds in repetition, the first correction angle adding unit 15 adds the first correction angle θ3 to the relative road surface angle θ2 that is input at step ST30 in a previous round.

The first correction angle adding unit 15 includes a timer not illustrated and determines whether the time corresponding to the first time section T1 elapses using the timer. That is, when it is determined YES at step ST24, the first correction angle adding unit 15 resets count of the timer. Thereafter, the first correction angle adding unit 15 updates the count of the timer each time it is determined NO at step ST27.

When the time corresponding to the first time section T1 elapses after the braking information changes ("YES" at step ST27), the first correction angle adding unit 15 instructs the first correction amount calculating unit 16 to calculate the first amount of correction Δθ3. Also, at that time, the first correction angle adding unit 15 outputs information indicating the time point at which the braking information changes, to the first correction amount calculating unit 16.

Next, at step ST31, the first correction amount calculating unit 16 calculates the first amount of correction Δθ3. That is, the first correction amount calculating unit 16 extracts the amount of change Δθ in the time section T including the time point at which the braking information changes out of the accumulated amount of changes Δθ. The first correction amount calculating unit 16 calculates the sum of the extracted amount of changes Δθ and calculates the first amount of correction Δθ3 by inverting the positive/negative sign of the sum. The first correction amount calculating unit 16 outputs the calculated first amount of correction Δθ3 to the first correction angle adding unit 15.

Next, at step ST32, the first correction angle adding unit 15 updates the value of the first correction angle θ3 by adding the first amount of correction Δθ3 input from the first correction amount calculating unit 16 at step ST31 to the previous first correction angle θ3. That is, the "previous first correction angle θ3" at step ST32 in a first round after the vehicle 1 stops is zero. The "previous first correction angle θ3" at step ST32 in second and subsequent rounds is the first correction angle θ3 after the update at step ST32 of a previous round. Thereafter, the first correction angle adding unit 15 maintains the value of the first correction angle θ3 until the value of the first correction angle θ3 is updated at step ST32 in a next round.

Next, at step ST25, the first correction angle adding unit 15 adds the first correction angle θ3 to the relative road surface angle θ2 that is input from the relative-road-surface-angle-during-stop calculating unit 12 at step ST30 in the final round. Next, at step ST26, the first correction angle adding unit 15 outputs the relative road surface angle θ2 obtained after addition at step ST25 to the optical axis control unit 18. Then, the first correction angle adding unit 15 returns to step ST22.

In this manner, the relative-road-surface-angle correcting unit 17 adds the first correction angle θ3 to the relative road surface angle θ2 each time the relative road surface angle θ2 is input from the relative-road-surface-angle-during-stop calculating unit 12 (steps ST23 and ST30) while the vehicle 1 is stationary("YES" at step ST22) to output to the optical axis control unit 18 (steps ST26 and ST29). The optical axis control unit 18 controls the optical axis angle of the headlights 6 and 7 on the basis of the latest relative road surface angle θ2 input from the relative-road-surface-angle correcting unit 17 while the vehicle 1 is stationary.

Note that in a processing example illustrated in FIG. 10, for example, when the braking information changes twice while the vehicle 1 is stationary and the time interval between a first change time point and a second change time point is shorter than the first time section T1, it is corrected by the amount of change Δθ twice in an overlapping time section, so that there is a possibility that the optical axis angle after the control by the optical axis control unit 18 is deviated in the opposite direction compared with a case without correction. In this case, the first correction amount calculating unit 16 may calculate a time section obtained by removing the time section overlapped with the time section T corresponding to the first change from the time section T corresponding to the second change, and calculate the first amount of correction Δθ3 which cancels out the amount of change Δθ in the time section at step ST31 for the second change in the braking information.

Also, in the processing example illustrated in FIG. 10, when the vehicle 1 starts before the time corresponding to the first time section T1 elapses after the braking information changes, the relative-road-surface-angle correcting unit 17 may stop the process. After the vehicle 1 starts, the relative-road-surface-angle-during-traveling calculating unit 11 calculates the relative road surface angle θ2 in accordance with the process illustrated in FIG. 8.

Next, with reference to FIG. 11, behavior of the vehicle 1 is described, focusing on the behavior when the operation state of the foot brake 2 changes while the vehicle is stationary. Note that the vehicle 1 includes the manual transmission instead of the automatic transmission 4, and that the foot brake 2 and the parking brake 3 compose the brake device 5.

FIG. 11A is a characteristic diagram illustrating a travel speed V of the vehicle 1 with respect to time t. FIG. 11B is a characteristic diagram illustrating an ideal relative road surface angle θ2 which is a calculation object of the relative-road-surface-angle calculating unit 13. FIG. 11C is a characteristic diagram illustrating the relative horizontal plane angle θ obtained by removing an effect of vibration of the vehicle body (characteristic line indicated with solid line in the drawing) and the relative horizontal plane angle θ with the effect of the vibration of the vehicle body (characteristic line indicated with broken line in the drawing). FIG. 11D is a timing chart illustrating an actual operation state of the foot brake 2. FIG. 11E is a timing chart illustrating the operation state of the foot brake 2 indicated by the braking information.

In an initial state (time t0), the vehicle 1 travels. Thereafter, the foot brake 2 is activated at time t1, and the vehicle 1 stops at time t2. While the vehicle 1 travels (time t0 to t2), the vehicle body of the vehicle 1 vibrates, and the value of the relative horizontal plane angle θ also vibrates. Also, while the vehicle 1 decelerates (time t1 to t2), a spring of a suspension provided on the vehicle 1 and a link and a bush of a stabilizer (hereinafter collectively referred to as "suspension device") are bent and the relative horizontal plane angle θ gradually changes in the forward inclining direction.

After the vehicle 1 stops, the foot brake 2 is released at time t3. When the foot brake 2 is released, bending of the suspension device is released and the relative horizontal plane angle θ temporarily changes in the backward inclining direction. Also, after the foot brake 2 is released, the vehicle body of the vehicle 1 vibrates, and the value of the relative horizontal plane angle θ vibrates in a damped manner. The changes in the relative horizontal plane angle θ are not caused by getting on/off of passengers or loading/unloading of the loads on the vehicle 1, so that they are preferably excluded from the object of the optical axis control.

Also, the foot brake 2 and the optical axis control apparatus 100 are connected via a communication line such as a controller area network (CAN) and a local area network (LAN). A delay time Δt occurs between time t3 at which the foot brake 2 is actually released and time t4 at which the braking information indicates the release of the foot brake 2 due to signal transmission time between the foot brake 2 and the optical axis control apparatus 100.

At that time, the relative-road-surface-angle correcting unit 17 performs correction to cancel out the amount of change Δθ of the relative horizontal plane angle θ in the time section T including the time point (time t4) at which the braking information changes by the first amount of correction Δθ3. The time section T includes the first time section T1 after the time point (time t4). By setting the first time section T1 to a value (for example, 500 milliseconds) larger than damping time of the vehicle body vibration, it is possible to exclude the amount of change Δθ by the vibration of the vehicle body from the object of the optical axis control. In addition, the time section T includes the second time section T2 before the time point (time t4). By setting the second time section T2 to a value (for example, 100 milliseconds) larger than the delay time Δt, it is possible to exclude the amount of change Δθ due to the release of the bending of the suspension device from the object of the optical axis control. As a result, it is possible to prevent the optical axis angle obtained after the control by the optical axis control unit 18 from deviating from the target value by the amount of changes Δθ.

After the foot brake 2 is released, the foot brake 2 operates again at time t5. The delay time Δt occurs between time t5 at which the foot brake 2 actually operates and time t6 at which the braking information indicates the operation of the foot brake 2 due to the signal transmission time between the foot brake 2 and the optical axis control apparatus 100. The relative-road-surface-angle correcting unit 17 performs correction to cancel out the amount of change Δθ of the relative horizontal plane angle θ in the time section T including the time point (time t6) at which the braking information changes as when the foot brake 2 is released (time t4).

After the foot brake 2 is activated again, a new passenger gets on a rear seat of the vehicle 1 at time t7. As the new passenger gets on the vehicle, the relative horizontal plane angle θ temporarily changes in the backward inclining direction. The relative-road-surface-angle-during-stop calculating unit 12 adds the amount of change Δθ due to the change and updates the relative road surface angle θ2. At that time, since the foot brake 2 is still in operation and there is no change in the braking information, the relative-road-surface-angle correcting unit 17 does not calculate the first amount of correction Δθ3 but maintains the value of the first correction angle θ3.

After the new passenger gets on, the foot brake 2 is released at time t8 and the vehicle 1 starts. After time t8, the relative-road-surface-angle calculating unit 13 calculates the relative road surface angle θ2 by using the output value of the acceleration sensor 9 as at time t0 to t2.

Although FIG. 11 illustrates an example in which the operation state of the foot brake 2 changes, also when the operation state of the parking brake 3 changes and when the range of the automatic transmission 4 is shifted, the relative road surface angle θ2 changes depending on the braking mechanism of the brake device 5. Especially, when the vehicle 1 stops on the slope, the change in the relative road surface angle θ2 is significant. The optical axis control apparatus 100 of Embodiment 1 may cancel out the amount of change Δθ when the operation state of the brake device 5 changes irrespective of the type of the brake device 5 and irrespective of the road surface gradient angle θ1 and prevent the optical axis angle after the control from deviating from the target value by the amount of change Δθ.

Also, generally, when the operation state of the brake device 5 changes a plurality of times while the vehicle 1 is stationary, the relative horizontal plane angle θ significantly changes by the first change, whereas the change in the relative horizontal plane angle θ by the second and subsequent changes is negligibly small. In the example of FIG. 11 also, while the relative horizontal plane angle θ changes with the first change in the operation state of the foot brake 2 (time t3), the relative horizontal plane angle θ scarcely changes by the second change in the operation state of the foot brake 2 (time t5).

Figure 12:
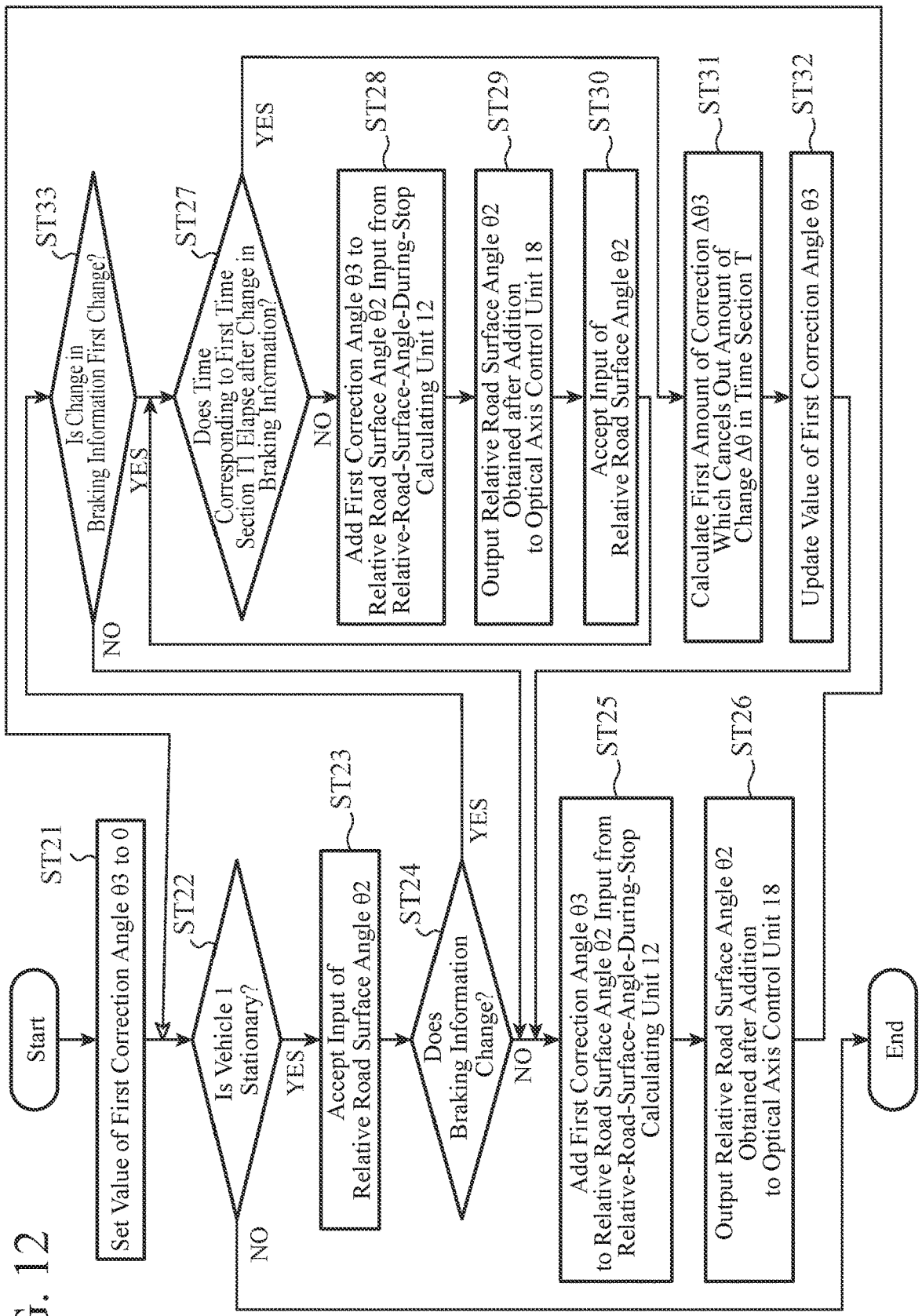
FIG. 12 is a flowchart illustrating another operation of the relative-road-surface-angle correcting unit according to Embodiment 1 of the present disclosure.

Therefore, it is also possible that the relative-road-surface-angle correcting unit 17 updates the value of the first correction angle θ3 only when the change in the braking information is the first change after the vehicle 1 stops. A flowchart for this case is illustrated in FIG. 12. At step ST33, when the braking information changes ("YES" at step ST24), the first correction angle adding unit 15 determines whether the change in the braking information is the first change after the vehicle 1 stops. When the change in the braking information is the first change ("YES" at step ST33), the first correction angle adding unit 15 shifts to step ST27. On the other hand, when the change in the braking information is the second or subsequent change ("NO" at step ST33), the first correction angle adding unit 15 shifts to step ST25. As a result, it is possible to skip unnecessarily updating the first correction angle θ3 for the second and subsequent changes, thereby reducing a processing load of the optical axis control apparatus 100.

In addition, it is sufficient that the first time section T1 be a value larger than the damping time of the vehicle body vibration generated depending on the weight of the vehicle 1 or a mechanical characteristic of the suspension device and this is not limited to 500 milliseconds. Also, the first time section T1 may be a time section excluding the time point at which the braking information changes, that is, a time section after the time point.

Also, it is sufficient that the second time section T2 be a value larger than the delay time Δt generated depending on a length of a communication line between the brake device 5 and the optical axis control apparatus 100 and this is not limited to 100 milliseconds. Also, the second time section T2 may be a time section including the time point at which the braking information changes, that is, a time section before the time point.

Also, the brake device 5 is not limited to the foot brake 2, the parking brake 3, and the automatic transmission 4. Any device may be used as long as this is a device for braking the vehicle 1.

Also, it is sufficient that the relative-road-surface-angle-during-traveling calculating unit 11 calculate the relative road surface angle θ2 using the output value of the acceleration sensor 9 while the vehicle 1 travels, and the process is not limited to the process of calculating the relative road surface angle θ2 using the amount of changes ΔGx and ΔGz of the accelerations Gx and Gz. For example, the relative-road-surface-angle-during-traveling calculating unit 11 may calculate the relative road surface angle θ2 by using the acceleration sensor 9 as the inclination sensor while the vehicle 1 travels. That is, while the vehicle 1 travels, the relative-road-surface-angle-during-traveling calculating unit 11 derives the relative road surface angle θ2 by calculating the relative horizontal plane angle θ by the process similar to that at step ST12 and subtracting the road surface gradient angle θ1 from the calculated relative horizontal plane angle θ. At that time, a reference value of the road surface gradient angle θ1 is stored in advance in the relative-road-surface-angle-during-traveling calculating unit 11, and in the first process, the road surface gradient angle θ1 is assumed to be the reference value. In the second and subsequent processes, it is assumed that the amount of change Δθ of the relative horizontal plane angle θ is the amount of change of the road surface gradient angle θ1, and the road surface gradient angle θ1 is updated by adding the amount of change Δθ to the previous road surface gradient angle θ1.

In addition, it is sufficient that the first amount of correction Δθ3 be that which cancels out the amount of change Δθ in the time section T, and this is not limited to a value obtained by inverting the positive/negative sign of the sum of the amount of changes Δθ in the time section T. The method of calculating the first amount of correction Δθ3 may be any method as long as it corresponds to the definition of the angle (the angle unit, the positive/negative direction of angle value with respect to the inclining direction and the like) in the process of the optical axis control apparatus 100.

Also, the correction of the relative road surface angle θ2 by the relative-road-surface-angle correcting unit 17 is not limited to the correction of adding the first correction angle θ3. The optical axis control apparatus 100 may variously respond to the change in the operation state of the brake device 5 depending on the content of correction by the relative-road-surface-angle correcting unit 17. In Embodiment 2 to be described later, the optical axis control apparatus 100 in which the relative-road-surface-angle correcting unit 17 performs correction different from that of Embodiment 1 is described.

As described above, the optical axis control apparatus 100 of Embodiment 1 is provided with the relative-road-surface-angle calculating unit 13 which calculates the relative horizontal plane angle θ being the inclination angle of the vehicle 1 with respect to the horizontal plane H by using the output value of the acceleration sensor 9 provided on the vehicle 1 and calculates the relative road surface angle θ2 which is the inclination angle of the vehicle 1 with respect to the road surface R by the integration of the amount of change Δθ of the relative horizontal plane angle θ while the vehicle 1 stops, the relative-road-surface-angle correcting unit 17 which obtains the braking information indicating the operation state of the brake device 5 provided on the vehicle 1 and corrects the relative road surface angle θ2 for the change in the braking information, and the optical axis control unit 18 which controls the optical axis of the headlights 6 and 7 provided on the vehicle 1 using the relative road surface angle θ2 corrected by the relative-road-surface-angle correcting unit 17. As a result, it is possible to variously respond to the change in the operation state of the brake device 5 depending on the content of correction by the relative-road-surface-angle correcting unit 17.

Also, the relative-road-surface-angle correcting unit 17 calculates the first amount of correction Δθ3 which cancels out the amount of change Δθ in the time section T including the time point at which the braking information changes and corrects the relative road surface angle θ2 using the first amount of correction Δθ3. As a result, it is possible to exclude the amount of change Δθ due to the change in the operation state of the brake device 5 from the object of the optical axis control while the vehicle 1 stops. As a result, it is possible to prevent the optical axis angle after the control by the optical axis control unit 18 from deviating from the target value by the amount of change Δθ, thereby improving accuracy of the optical axis control.

Also, the time section T includes the first time section T1 after the time point at which the braking information changes. As a result, it is possible to exclude the amount of change Δθ due to the vibration of the vehicle body of the vehicle 1 after the operation state of the brake device 5 changes from the object of the optical axis control.

Also, the time section T includes the second time section T2 before the time point at which the braking information changes. As a result, in consideration of the delay time Δt due to the signal transmission time and the like between the brake device 5 and the optical axis control apparatus 100, the amount of change Δθ due to the release of the bending of the suspension device when the operation state of the brake device 5 changes may be excluded from the object of the optical axis control.

Also, when the braking information changes a plurality of times while the vehicle 1 stops, the relative-road-surface-angle correcting unit 17 corrects the relative road surface angle θ2 for the first change. As a result, it is possible to skip unnecessarily updating the first correction angle θ3 for the second and subsequent changes, thereby reducing a processing load of the optical axis control apparatus 100.

Embodiment 2

Figure 13:
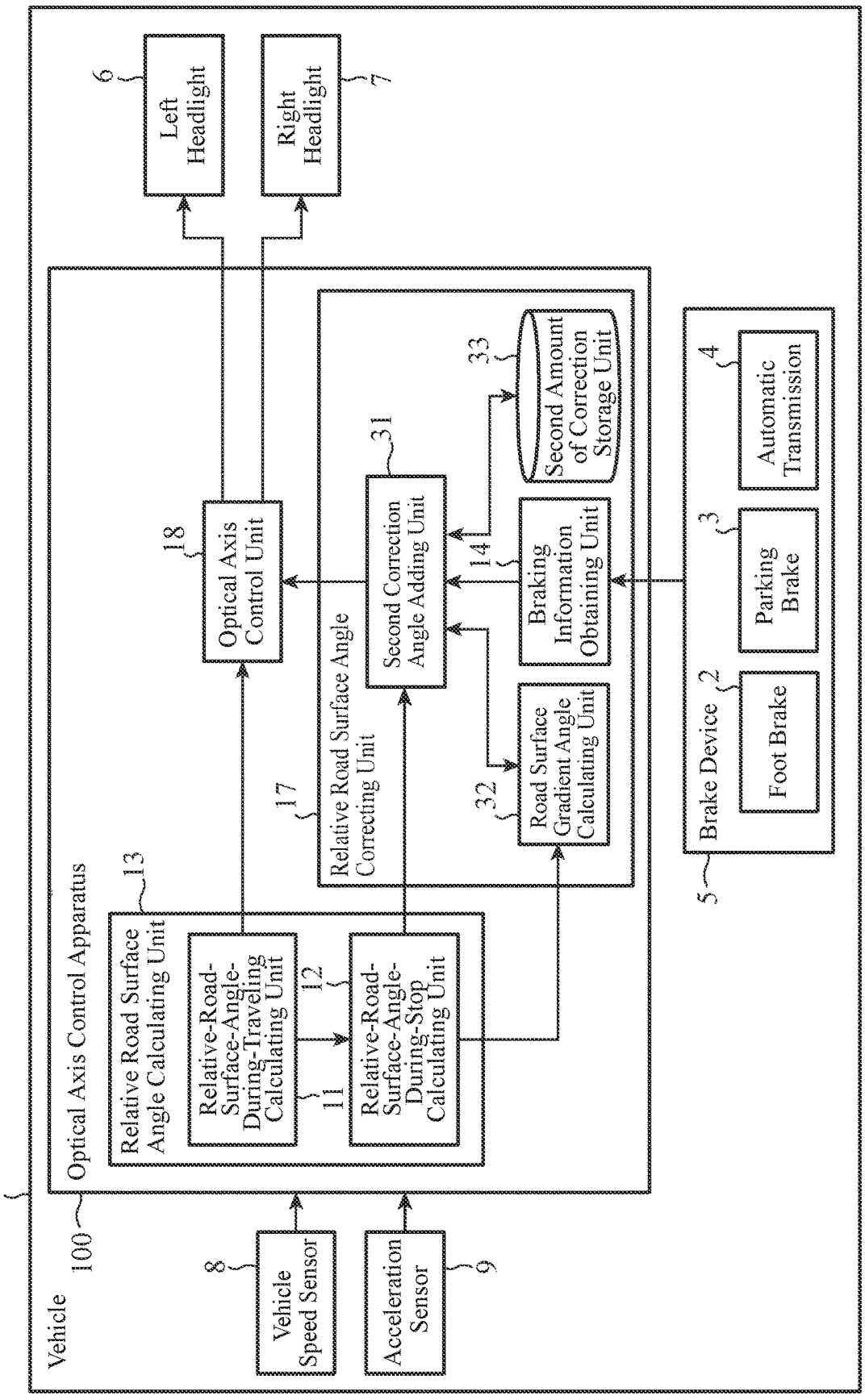
FIG. 13 is a functional block diagram illustrating a substantial part of an optical axis control apparatus according to Embodiment 2 of the present disclosure.

FIG. 13 is a functional block diagram illustrating a substantial part of an optical axis control apparatus according to Embodiment 2 according to the present disclosure. An optical axis control apparatus 100 according to Embodiment 2 is described with reference to FIG. 13. Note that, in FIG. 13, the same reference sign is assigned to a block similar to that in a functional block diagram of Embodiment 1 illustrated in FIG. 1, and the description thereof is not repeated. Also, since a hardware configuration of the optical axis control apparatus 100 according to Embodiment 2 is similar to the hardware configuration of Embodiment 1 illustrated in FIGS. 3 and 4, the illustration and description thereof are not repeated.

A principle that a relative road surface angle θ2 changes due to a change in operation state of a brake device 5 while a vehicle 1 stops differs depending on a type or a combination of the brake device 5 the operation state of which changes.

For example, when a foot brake 2 is released and a parking brake 3 operates after the vehicle 1 stops by the foot brake 2 on a slope, braking by a disk brake of the foot brake 2 is switched to braking by a drum brake of the parking brake 3. Since a braking mechanism after switching is different from that before the switching, the vehicle 1 slightly descends the slope and bending of a suspension device changes, so that a relative road surface angle θ2 changes.

Also, when the foot brake 2 is released and an automatic transmission 4 is set to a P range after the vehicle 1 stops by the foot brake 2 on the slope, the braking by the disk brake of the foot brake 2 is switched to braking by gear fixing of the automatic transmission 4. Since a braking mechanism after switching is different from that before the switching, the vehicle 1 slightly descends the slope and bending of a suspension device changes, so that a relative road surface angle θ2 changes.

Also, when the automatic transmission 4 is set to the P range and then the parking brake 3 operates and the foot brake 2 is released after the vehicle 1 stops by the foot brake 2 on the slope, the braking mechanism is sequentially switched from the braking by the disc brake, braking by the disk brake and the gear fixing, and braking by the gear fixing and the drum brake. Thereafter, when the automatic transmission 4 is shifted from the P range to a drive range (hereinafter referred to as a "D range") before the vehicle 1 starts, the braking by the gear fixing and the drum brake is switched to the braking only by the drum brake. By switching of the braking mechanism, the bending of the suspension device changes and the relative road surface angle θ2 changes as in the above-described example.

In addition, the relative road surface angle θ2 variously changes for each type or combination of the brake devices 5 operation states of which change.

The change in the relative road surface angle θ2 due to the operation or release of the foot brake 2 is remarkable also when the vehicle 1 stops on a flat ground. When the vehicle 1 stops on the slope, in addition to the change in the relative road surface angle θ2 caused by the operation or release of the foot brake 2, the change in the relative road surface angle θ2 due to operation or release of the parking brake 3 and the change in the relative road surface angle θ2 due to range shift of the automatic transmission 4 are also remarkable.

That is, an amount of change Δθ in the event that the operation state of the brake device 5 changes takes a value depending on the change in the operation state of the brake device 5 and the road surface gradient angle θ1. Also, the amount of change Δθ at that time is a value depending on a weight of the vehicle 1, a position of the center of gravity in the vehicle 1, a structure of the suspension device, a drive system of the vehicle 1 and the like. The optical axis control apparatus 100 of Embodiment 2 stores an amount of correction (hereinafter referred to as a "second amount of correction") Δθ4 set in advance for each parameter and corrects the relative road surface angle by using the second amount of correction Δθ4 when braking information changes.

A relative-road-surface-angle-during-stop calculating unit 12 outputs a calculated relative horizontal plane angle θ to a road surface gradient angle calculating unit 32. Also, the relative-road-surface-angle-during-stop calculating unit 12 outputs the calculated relative road surface angle θ2 to a second correction angle adding unit 31 and the road surface gradient angle calculating unit 32. A braking information obtaining unit 14 outputs the obtained braking information to the second correction angle adding unit 31.

The second correction angle adding unit 31 holds a value of an angle (hereinafter referred to as a "second correction angle") θ4 used for correcting the relative road surface angle θ2 calculated by the relative-road-surface-angle-during-stop calculating unit 12. An initial value of the second correction angle θ4 is set to zero, for example. The second correction angle adding unit 31 adds the second correction angle θ4 to the relative road surface angle θ2 input from the relative-road-surface-angle-during-stop calculating unit 12, and then outputs the relative road surface angle θ2 after addition to an optical axis control unit 18.

The second correction angle adding unit 31 monitors the braking information input from the braking information obtaining unit 14 and detects the change in the braking information. The second correction angle adding unit 31 instructs the road surface gradient angle calculating unit 32 to calculate the road surface gradient angle θ1 when the braking information changes.

The road surface gradient angle calculating unit calculates the road surface gradient angle θ1 by subtracting the latest relative road surface angle θ2 calculated by the relative-road-surface-angle-during-stop calculating unit 12 from the latest relative horizontal plane angle θ calculated by the relative-road-surface-angle-during-stop calculating unit 12. The road surface gradient angle calculating unit 32 outputs the calculated road surface gradient angle θ1 to the second correction angle adding unit 31.

The second correction angle adding unit 31 stores in advance information indicating which of front-wheel drive, rear-wheel drive, and four-wheel drive the drive system of the vehicle 1 is. Also, the second amount of correction Δθ4 is stored in advance in a second amount of correction storage unit 33. The second correction angle adding unit 31 obtains the second amount of correction Δθ4 depending on the drive system of the vehicle 1, the road surface gradient angle θ1 calculated by the road surface gradient angle calculating unit 32, and the detected change in the braking information from the second amount of correction storage unit 33.

The second amount of correction Δθ4 is, for example, a value set in advance by a manufacturer of the optical axis control apparatus 100 when manufacturing the optical axis control apparatus 100. Alternatively, the second amount of correction Δθ4 is a value set in advance by a manufacturer of the vehicle 1 when mounting the optical axis control apparatus 100 on the vehicle 1.

FIG. 14 illustrates examples of the second amount of correction Δθ4. In FIG. 14, an angle unit is degree) (°). As illustrated in FIG. 14, the second amount of correction Δθ4 is set for each change in the braking information, that is, for each change in the operation state of the brake device 5. Also, the second amount of correction Δθ4 is set for each drive system of the vehicle 1, that is, depending on whether this is front-wheel drive or the rear-wheel drive. Also, the second amount of correction Δθ4 is set for each road surface gradient angle θ1, that is, for each inclining direction (upward or downward) of a road surface R and a value of the road surface gradient angle θ1.

Herein, when the operation state of the brake device 5 changes, a changing direction (forward inclination or backward inclination) of the relative road surface angle is determined based on the way of change in the operation state of the brake device 5, the drive system of the vehicle 1, the road surface gradient angle θ1 and the like. A correction direction (forward inclination or backward inclination) of the second amount of correction Δθ4 is set in a direction opposite to the changing direction of the relative road surface angle θ2.

Note that the second amount of correction Δθ4 is not set for the cases in which the foot brake 2 is released and a value of the road surface gradient angle θ1 is one degree or larger. This is because, when this condition is satisfied, the vehicle 1 starts descending the slope without the change in the relative road surface angle θ2, so that the correction by the second amount of correction Δθ4 is not necessary.

When the second correction angle adding unit 31 obtains the second amount of correction Δθ4 from the second amount of correction storage unit 33, it updates the value of the second correction angle Δθ4 by adding the second amount of correction Δθ4 to the previous second correction angle θ4. Thereafter, the second correction angle adding unit 31 maintains the value of the second correction angle until next update of the second correction angle θ4 while the vehicle 1 is stationary.

The braking information obtaining unit 14, the second correction angle adding unit 31, the road surface gradient angle calculating unit 32, and the second amount of correction storage unit 33 compose a relative-road-surface-angle correcting unit 17.

Operation of a relative-road-surface-angle-during-traveling calculating unit 11 is similar to that described with reference to FIG. 8 in Embodiment 1, so that the illustration and description thereof are not repeated.

Operation of the relative-road-surface-angle-during-stop calculating unit 12 is similar to that described with reference to FIG. 9 in Embodiment 1, so that the illustration and description thereof are not repeated. Note that, in Embodiment 2, the relative-road-surface-angle-during-stop calculating unit 12 outputs the calculated relative horizontal plane angle θ to the road surface gradient angle calculating unit 32 at step ST12. At step ST15, the relative-road-surface-angle-during-stop calculating unit 12 outputs the calculated relative road surface angle θ2 to the second correction angle adding unit 31 and the road surface gradient angle calculating unit 32.

Figure 15:
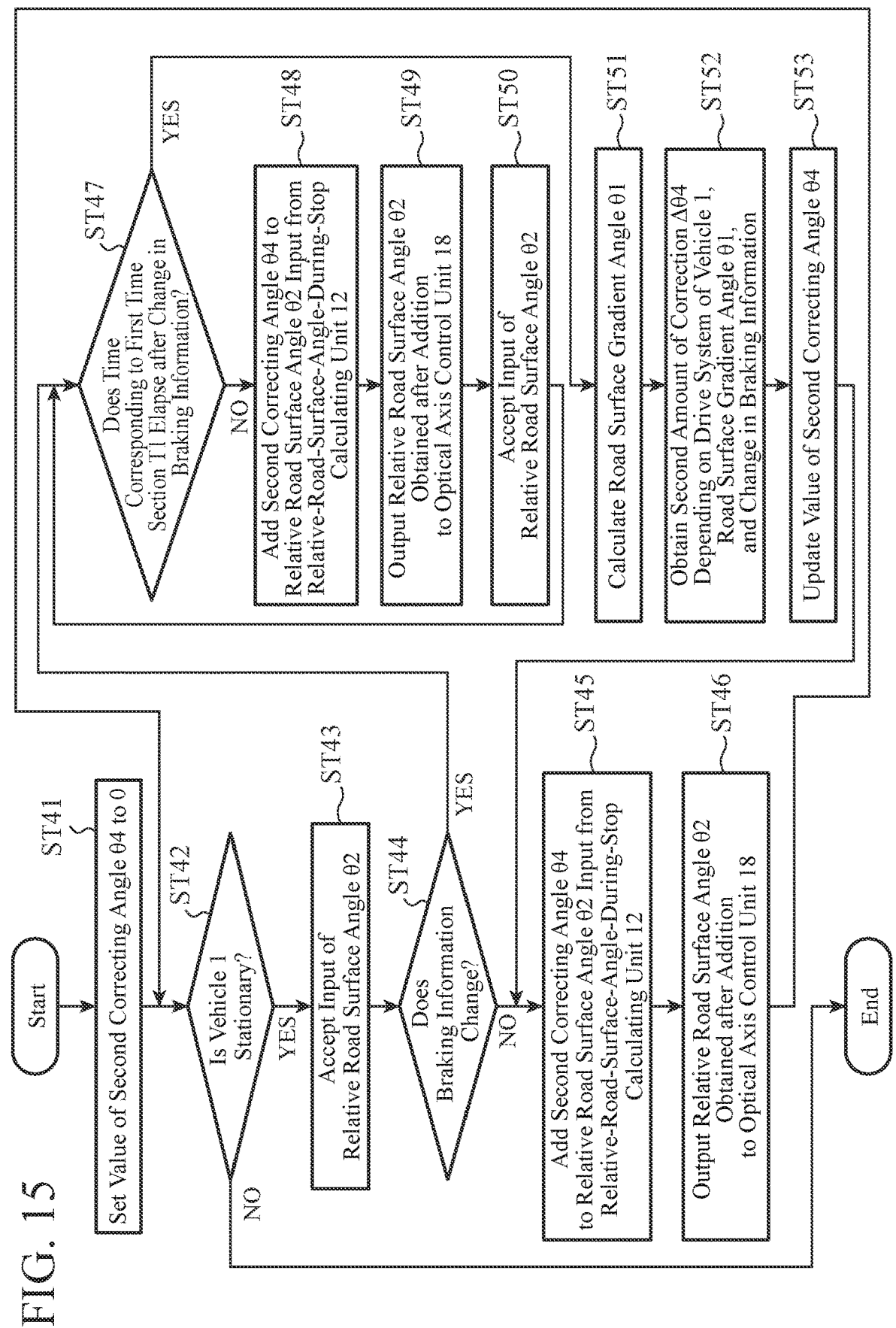
FIG. 15 is a flowchart illustrating operation of a relative-road-surface-angle correcting unit according to Embodiment 2 of the present disclosure.

Next, with reference to a flowchart of FIG. 15, operation of the relative-road-surface-angle correcting unit 17 is described focusing on operation of the second correction angle adding unit 31 and the road surface gradient angle calculating unit 32. Note that a time interval in which the relative-road-surface-angle-during-stop calculating unit 12 calculates the relative road surface angle θ2 to output it to the second correction angle adding unit 31 is set to a value smaller than a first time section T1. Also, the second amount of correction Δθ4 illustrated in FIG. 14 is stored in the second amount of correction storage unit 33.

First, at step ST41, the second correction angle adding unit 31 sets the value of the second correction angle θ4 to the initial value, that is, zero. Thereafter, the second correction angle adding unit 31 maintains the value of the second correction angle θ4 to zero until the value of the second correction angle θ4 is updated at step ST53 to be described later.

Next, at step ST42, the second correction angle adding unit 31 determines whether the vehicle 1 is stationary by using a vehicle speed signal output from a vehicle speed sensor 8. When the vehicle 1 is stationary ("YES" at step ST42), at step ST43, the second correction angle adding unit 31 accepts an input of the relative road surface angle θ2 output by the relative-road-surface-angle-during-stop calculating unit 12 at step ST15 in FIG. 9.

Next, at step ST44, the second correction angle adding unit 31 determines whether the braking information changes. Since a detailed processing content at step ST44 is similar to that at step ST24 in FIG. 10, the description thereof is not repeated.

When the braking information does not change ("NO" at step ST44), at step ST45, the second correction angle adding unit 31 adds the second correction angle θ4 to the relative road surface angle θ2 input from the relative-road-surface-angle-during-stop calculating unit 12 at step ST43.

Next, at step ST46, the second correction angle adding unit 31 outputs the relative road surface angle θ2 after addition at step ST45 to the optical axis control unit 18. Then, the second correction angle adding unit 31 returns to step ST42.

On the other hand, when the braking information changes ("YES" at step ST44), at step ST47, the second correction angle adding unit 31 determines whether a time corresponding to the first time section T1 elapses after the braking information changes. When the time corresponding to the first time section T1 does not elapse ("NO" at step ST47), at step ST48, the second correction angle adding unit 31 adds the second correction angle θ4 to the relative road surface angle θ2 input from the relative-road-surface-angle-during-stop calculating unit 12 at step ST43.

Next, at step ST49, the second correction angle adding unit 31 outputs the relative road surface angle θ2 obtained after addition at step ST48 to the optical axis control unit 18.

Next, at step ST50, the second correction angle adding unit 31 accepts an input of a new relative road surface angle θ2 from the relative-road-surface-angle-during-stop calculating unit 12. Thereafter, the second correction angle adding unit 31 repeatedly executes the processes at steps ST48 to ST50 until the time corresponding to the first time section T1 elapses after the braking information changes. Note that at step ST48 of the second and subsequent rounds in repetition, the second correction angle adding unit 31 adds the second correction angle θ4 to the relative road surface angle θ2 input at step ST50 of a previous round.

When the time corresponding to the first time section T1 elapses after the braking information changes ("YES" at step ST47), the second correction angle adding unit 31 instructs the road surface gradient angle calculating unit 32 to calculate the road surface gradient angle θ1. Note that the reason for issuing the instruction of the calculation of the road surface gradient angle θ1 after the lapse of the time corresponding to the first time section T1 is to wait for vibration of the relative horizontal plane angle θ due to vibration of a vehicle body to damp after the operation state of the brake device 5 changes, and to calculate the road surface gradient angle θ1 in a state in which a value of the relative horizontal plane angle θ is stable.

Next, at step ST51, the road surface gradient angle calculating unit 32 calculates the road surface gradient angle θ1. That is, the road surface gradient angle calculating unit 32 calculates the road surface gradient angle θ1 by subtracting the latest relative road surface angle θ2 calculated by the relative-road-surface-angle-during-stop calculating unit 12 from the latest relative horizontal plane angle θ calculated by the relative-road-surface-angle-during-stop calculating unit 12. The road surface gradient angle calculating unit 32 outputs the calculated road surface gradient angle θ1 to the second correction angle adding unit 31.

Next, at step ST52, the second correction angle adding unit 31 obtains the second amount of correction Δθ4 depending on the drive system of the vehicle 1 stored in advance, the road surface gradient angle θ1 input from the road surface gradient angle calculating unit 32 at step ST48, and the change in the braking information determined at step ST43 out of the second amount of corrections Δθ4 stored in the second amount of correction storage unit 33.

Next, at step ST53, the second correction angle adding unit 31 updates the value of the second correction angle θ4 by adding the second amount of correction Δθ4 obtained from the second amount of correction storage unit 33 at step ST52 to the previous second correction angle θ4. That is, the "previous second correction angle θ4" at step ST53 in a first round after the vehicle 1 stops is zero. The "previous second correction angle θ4" at step ST53 of second and subsequent rounds is the second correction angle θ4 obtained after the update at step ST53 in a previous round. Thereafter, the second correction angle adding unit 31 maintains the value of the second correction angle θ4 until the value of the second correction angle θ4 is updated at step ST53 in a next round.

Next, at step ST45, the second correction angle adding unit 31 adds the second correction angle θ4 to the relative road surface angle θ2 input from the relative-road-surface-angle-during-stop calculating unit 12 at step ST50 in a final round. Next, at step ST46, the second correction angle adding unit 31 outputs the relative road surface angle θ2 obtained after addition at step ST45 to the optical axis control unit 18. Then, the second correction angle adding unit 31 returns to step ST42.

In this manner, the relative-road-surface-angle correcting unit 17 adds the second correction angle θ4 to the relative road surface angle θ2 to output to the optical axis control unit 18 (steps ST46 and ST49) each time the relative road surface angle θ2 is input from the relative-road-surface-angle-during-stop calculating unit 12 (steps ST43 and ST50) while the vehicle 1 is stationary ("YES" at step ST42). The optical axis control unit 18 controls the optical axis angle of the headlights 6 and 7 on the basis of the latest relative road surface angle θ2 input from the relative-road-surface-angle correcting unit 17 while the vehicle 1 stops.

Herein, in the optical axis control apparatus 100 according to Embodiment 2, the correction direction of the second amount of correction Δθ4 is set in the direction opposite to the changing direction of the relative road surface angle θ2 due to the change in the operation state of the brake device 5. Therefore, it is possible to reduce deviation of the optical axis angle of the headlights 6 and controlled by the optical axis control unit 18, the deviation being caused by the amount of change Δθ when the operation state of the brake device 5 changes. As a result, accuracy of the optical axis control may be improved.

Also, the second amount of correction Δθ4 is a value set in advance. As a result, a process of calculating the second amount of correction Δθ4 is unnecessary and a processing load of the optical axis control apparatus 100 can be reduced.

Also, the second amount of correction Δθ4 is set for each change in the braking information, each drive system of the vehicle 1, and each road surface gradient angle θ1. As a result, it is possible to improve an effect of reducing the deviation of the controlled optical axis angle of the headlights 6 and 7 with respect to a target value, thereby further improving the accuracy of the optical axis control while reducing the processing load of the optical axis control apparatus 100 as described above.

Note that the second amount of correction Δθ4 may be any value as long as it is set in advance, and is not limited to the examples illustrated in FIG. 14. For example, in addition to the second amount of correction Δθ4 when the drive system of the vehicle 1 is the front-wheel drive or the rear-wheel drive, the second amount of correction Δθ4 when the drive system of the vehicle 1 is the four-wheel drive may be set. Also, the change in the braking information may indicate the operation state of any type of device out of any number of brake device 5 is changed from which state to which state. Furthermore, the second amount of correction Δθ4 may be set for each weight of the vehicle 1, each position of the center of gravity of the vehicle 1, or each structure of the suspension device. For example, the second correction angle adding unit 31 detects the weight or the position of the center of gravity of the vehicle 1 by using a load sensor not illustrated provided on the vehicle 1 and obtains the second amount of correction Δθ4 depending on the weight or the position of the center of gravity from the second amount of correction storage unit 33. Alternatively, the second correction angle adding unit 31 stores information indicating the structure of the suspension device in advance, and obtains the second amount of correction Δθ4 depending on the structure of the suspension device from the second amount of correction storage unit 33.

Figure 16:
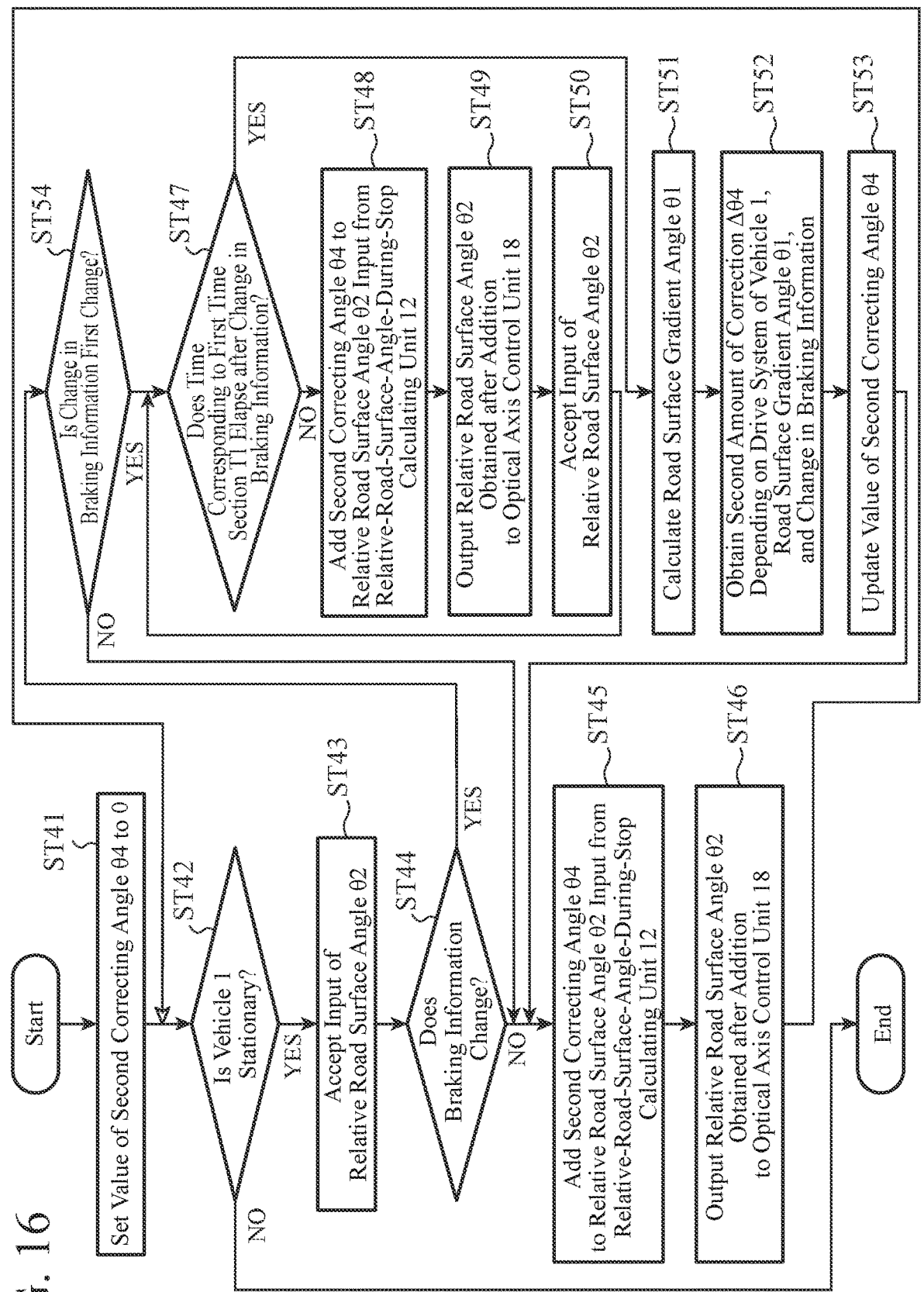
FIG. 16 is a flowchart illustrating another operation of the relative-road-surface-angle correcting unit according to Embodiment 2 of the present disclosure.

In addition, the optical axis control apparatus 100 of Embodiment 2 may adopt various modified examples similar to those described in Embodiment 1. For example, the relative-road-surface-angle correcting unit 17 may update the value of the second correction angle θ4 only when the change of the braking information is the first change after the vehicle 1 stops. A flowchart of this case is illustrated in FIG. 16. When the braking information changes ("YES" at step ST44), at step ST54, the second correction angle adding unit 31 determines whether the change in the braking information is the first change after the vehicle 1 stops. When the change in the braking information is the first change ("YES" at step ST54), the second correction angle adding unit 31 shifts to step ST47. On the other hand, when the change in the braking information is the second or subsequent change ("NO" at step ST54), the second correction angle adding unit 31 shifts to step ST45. As a result, it is possible to skip unnecessarily updating the second correction angle θ4 for the second and subsequent changes, thereby reducing the processing load of the optical axis control apparatus 100.

Also, the content of the correction by the relative-road-surface-angle correcting unit 17 is not limited to that illustrated in Embodiments 1 and 2. The relative-road-surface-angle correcting unit 17 may perform any correction as long as this may reduce the effect of the amount of change Δθ by the change on the optical axis control when the operation state of the brake device 5 changes.

As described above, the optical axis control apparatus 100 of Embodiment 2 is provided with the relative-road-surface-angle calculating unit 13 which calculates the relative horizontal plane angle θ being an inclination angle of the vehicle 1 with respect to a horizontal plane H by using the output value of the acceleration sensor 9 provided on the vehicle 1 and calculates the relative road surface angle θ2 being the inclination angle of the vehicle 1 with respect to the road surface R by integrating the amount of change Δθ of the relative horizontal plane angle θ while the vehicle 1 stops, the relative-road-surface-angle correcting unit 17 which corrects the relative road surface angle θ2 for the change in the braking information by obtaining the braking information indicating the operation state of the brake device 5 provided on the vehicle 1, and the optical axis control unit 18 which controls the optical axis of the headlights 6 and 7 provided on the vehicle 1 using the relative road surface angle θ2 corrected by the relative-road-surface-angle correcting unit 17. As a result, it is possible to variously respond to the change in the operation state of the brake device 5 depending on the content of correction by the relative-road-surface-angle correcting unit 17.

Also, when the braking information changes, the relative-road-surface-angle correcting unit 17 corrects the relative road surface angle θ2 by using the second amount of correction Δθ4 set in advance. As a result, a process of calculating the second amount of correction Δθ4 becomes unnecessary and a processing load of the optical axis control apparatus 100 may be reduced.

Also, the correction direction of the second amount of correction Δθ4 is set in the direction opposite to the changing direction of the relative road surface angle θ2 due to the change in the operation state of the brake device 5. This makes it possible to reduce the deviation of the optical axis angle of the headlights 6 and 7 after the control with respect to the target value caused by the amount of change Δθ when the operation state of the brake device 5 changes. As a result, accuracy of the optical axis control may be improved.

Also, the second amount of correction Δθ4 is set for each road surface gradient angle θ1 being the inclination angle of the road surface R with respect to the horizontal plane H. As a result, it is possible to improve the effect of reducing the deviation of the optical axis angle of the headlights 6 and 7 after the control with respect to the target value, thereby further improving the accuracy of the optical axis control.

Also, when the braking information changes a plurality of times while the vehicle 1 stops, the relative-road-surface-angle correcting unit 17 corrects the relative road surface angle θ2 only for the first change. As a result, it becomes possible to skip unnecessarily updating the second correction angle θ4 for the second and subsequent changes, thereby reducing the processing load of the optical axis control apparatus 100.

Note that Embodiments may be freely combined, any component of each Embodiment may be modified, or any component of each Embodiment may be omitted within the scope of the present invention.

INDUSTRIAL APPLICABILITY

An optical axis control apparatus according to the present disclosure may be used for an optical axis control of a headlight.

REFERENCE SIGNS LIST

1: Vehicle, 2: Foot brake, 3: Parking brake, 4: Automatic transmission, 5: Brake device, 6: Left headlight, 7: Right headlight, 8: Vehicle speed sensor, 9: Acceleration sensor, 11: Relative-road-surface-angle-during-traveling calculating unit, 12: Relative-road-surface-angle-during-stop calculating unit, 13: Relative road surface angle calculating unit, 14: Braking information obtaining unit, 15: First correction angle adding unit, 16: First correction amount calculating unit, 17: Relative road surface angle correcting unit, 18: Optical axis control unit, 21: Processor, 22: Memory, 23: Processing circuit, 31: Second correction angle adding unit, 32: Road surface gradient angle calculating unit, 33: Second amount of correction storage unit, 100: Optical axis control apparatus, 200: Control apparatus.

The invention claimed is:

1. An optical, axis control apparatus comprising: processing circuitry to
calculate a relative horizontal plane angle being an inclination angle of a vehicle with respect to a horizontal plane by using an output value of an acceleration sensor provided on the vehicle, calculate a relative road surface angle being an inclination angle of the vehicle with respect to a road surface by integrating an amount of change of the relative horizontal plane angle, while the vehicle is stationary;
calculate a relative horizontal plane angle from an amount of change between accelerations in a vertical direction of the vehicle at two different time points, and an amount of change between accelerations in a front-back direction of the vehicle at the two time points, while the vehicle is traveling:
obtain braking information indicating an operation state of a brake device provided on the vehicle, and for correcting the relative road surface angle in response to a change in the braking information; and
control an optical axis of a headlight provided on the vehicle by using the corrected relative road surface angle.

2. The optical axis control apparatus according to claim 1, wherein the processing circuitry calculates a first amount of correction which cancels out the amount of change in a time section including a time point at which the braking information changes, and corrects the relative road surface angle by using the first amount of correction.

3. The optical axis control apparatus according to claim 2, wherein the time section includes a first time section after the time point at which the braking information changes.

4. The optical axis control apparatus according, to claim 2, wherein the time section includes a second time section before the time point at which the braking information changes.

5. The optical axis control apparatus according to claim 4, wherein the second time section is set to a value larger than a delay time from a change in the operation state to the change in the braking information.

6. The optical axis control apparatus according to claim 1, wherein the processing circuitry corrects the relative road surface angle by using a second amount of correction set in advance when the braking information changes.

7. The optical axis control apparatus according to claim 6, wherein a correction direction of the second amount of correction is set in a direction opposite to a changing direction of the relative road surface angle due to the change in the operation state.

8. The optical axis control apparatus according to claim 6, wherein the second amount of correction is set for each road surface gradient angle being an inclination angle of the road surface with respect to the horizontal plane.

9. The optical axis control apparatus according to claim 1, wherein the processing circuitry corrects the relative road surface angle in response to a first change when the braking information changes a plurality of times while the vehicle is stationary.

10. The optical axis control apparatus according to claim 1, wherein the optical axis control apparatus is formed integrally with the acceleration sensor.

11. The optical axis control apparatus according to claim 1, wherein, the optical axis control apparatus is formed integrally with another control apparatus for executing control different from the control of the optical axis.

* * * * *